United States Patent
Nakajima et al.

(10) Patent No.: US 11,685,145 B2
(45) Date of Patent: Jun. 27, 2023

(54) FLOW PATH STRUCTURE, LIQUID EJECTING APPARATUS, LIQUID EJECTING HEAD, AND METHOD OF MANUFACTURING FLOW PATH STRUCTURE

(71) Applicant: SEIKO EPSON CORPORATION, Tokyo (JP)

(72) Inventors: Yoshinori Nakajima, Matsumoto (JP); Shun Katsuie, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 229 days.

(21) Appl. No.: 17/083,852

(22) Filed: Oct. 29, 2020

(65) Prior Publication Data
US 2021/0129512 A1  May 6, 2021

(30) Foreign Application Priority Data
Oct. 31, 2019  (JP) .................................. 2019-198526

(51) Int. Cl.
*B41J 2/175* (2006.01)
*B41J 2/14* (2006.01)
(Continued)

(52) U.S. Cl.
CPC .......... *B32B 27/36* (2013.01); *B29C 45/0013* (2013.01); *B29C 45/0055* (2013.01);
(Continued)

(58) Field of Classification Search
CPC ... B41J 2/14; B41J 2/17; B41J 2/14274; B41J 2/175; B41J 2/17509; B41J 29/02;
(Continued)

(56) References Cited

U.S. PATENT DOCUMENTS 5,387,314 A * 2/1995 Baughman ............. B41J 2/1629
216/99
5,818,481 A   10/1998 Hotomi et al.
(Continued)

FOREIGN PATENT DOCUMENTS

CN   106364163   2/2017
JP   H05-138887  6/1993
(Continued)

*Primary Examiner* — Anh T Vo
(74) *Attorney, Agent, or Firm* — Workman Nydegger

(57) ABSTRACT

A flow path structure including a first-flow path includes a first-flow path member that including a first-resin member made of a resin and a first-film member having a film, a second-flow path member laminated on the first-flow path member and adhered to the first-flow path member, in which the first-resin member includes a first-front surface that is a surface facing the second-flow path member and that is provided with a first-recessed portion, the first-film member includes a first-surface and a second-surface that is opposite from the first-surface, at least a portion of the first-surface is in close contact with a front surface of the first-resin member inside the first-recessed portion, and the second-surface and the second-flow path member define at least a portion of the first-flow path in a region overlapping the first-recessed portion in a laminating direction of the first-flow path member and the second-flow path member.

20 Claims, 19 Drawing Sheets

(51) Int. Cl.
    *B41J 2/135* (2006.01)
    *B32B 1/08* (2006.01)
    *B32B 7/12* (2006.01)
    *B32B 27/08* (2006.01)
    *B32B 27/18* (2006.01)
    *B32B 27/30* (2006.01)
    *B32B 27/32* (2006.01)
    *B32B 27/36* (2006.01)
    *B29C 45/00* (2006.01)
    *B29C 45/14* (2006.01)
    *B41J 2/17* (2006.01)

(52) U.S. Cl.
CPC .. *B29C 45/14008* (2013.01); *B29C 45/14065* (2013.01); *B32B 1/08* (2013.01); *B32B 7/12* (2013.01); *B32B 27/08* (2013.01); *B32B 27/18* (2013.01); *B32B 27/304* (2013.01); *B32B 27/32* (2013.01); *B41J 2/135* (2013.01); *B41J 2/14* (2013.01); *B41J 2/17* (2013.01); *B41J 2/175* (2013.01); *B32B 2307/7242* (2013.01); *B32B 2597/00* (2013.01)

(58) Field of Classification Search
CPC ... B41J 29/13; B41J 2002/14362; B32B 1/08; B32B 7/022; B32B 3/08; B32B 3/30; B32B 7/12; B32B 15/18; B32B 15/20; B32B 27/20; B32B 9/025; B32B 3/266; B32B 27/304; B32B 9/045; B32B 27/32; B32B 27/36; B32B 27/302; B32B 2597/00; B32B 2264/102; B32B 2307/7244; B32B 2307/7265; B32B 2262/10; B32B 2262/106; B32B 2307/7242; B32B 2307/732; B29C 45/0055; B29C 45/14065; B29C 45/0013; B29C 45/14008; B29C 45/14336; B29C 2045/14245

See application file for complete search history.

(56) References Cited

U.S. PATENT DOCUMENTS

| | | | |
|---|---|---|---|
| 8,653,410 B2 * | 2/2014 | Mulloy | B23K 26/1462 219/121.71 |
| 2017/0021613 A1 | 1/2017 | Hanagami et al. | |
| 2018/0009220 A1 | 1/2018 | Hanagami et al. | |
| 2019/0061243 A1 | 2/2019 | Saito et al. | |

FOREIGN PATENT DOCUMENTS

| | | |
|---|---|---|
| JP | H08-216418 | 8/1996 |
| JP | 2007-050587 | 3/2007 |
| JP | 2008-119871 | 5/2008 |
| JP | 2010-036481 | 2/2010 |
| JP | 2019-081263 | 5/2019 |

* cited by examiner

FLOW PATH STRUCTURE, LIQUID EJECTING APPARATUS, LIQUID EJECTING HEAD, AND METHOD OF MANUFACTURING FLOW PATH STRUCTURE

The present application is based on, and claims priority from JP Application Serial Number 2019-198526, filed Oct. 31, 2019, the disclosure of which is hereby incorporated by reference herein in its entirety.

BACKGROUND

1. Technical Field

The present disclosure relates to a flow path structure, a liquid ejecting apparatus, a liquid ejecting head, and a method of manufacturing the flow path structure.

2. Related Art

Regarding a flow path member that is provided in a device such as an ink jet printer and causes a liquid such as ink to flow inside the device, for example, a flow path member made of a resin material such as a flow path member described in JP-A-2019-81263 is known.

When the flow path member is made of the resin material as described above, there is a possibility that foreign matter such as burrs generated when the flow path member is molded may be mixed with the liquid flowing in the flow path.

SUMMARY

According to an aspect of the present disclosure, a flow path structure is provided. The flow path structure including a first flow path includes a first flow path member that includes a first resin member made of a resin and a first film member having a film, a second flow path member laminated on the first flow path member and adhered to the first flow path member, in which the first resin member includes a first front surface which is a surface facing the second flow path member and is provided with a first recessed portion, the first film member includes a first surface and a second surface opposite to the first surface, at least a portion of the first surface is in close contact with a front surface of the first resin member inside the first recessed portion, and the second surface of the first film member and the second flow path member define at least a portion of the first flow path in a region overlapping the first recessed portion in a laminating direction of the first flow path member and the second flow path member.

DESCRIPTION OF EXEMPLARY EMBODIMENTS

A. First Embodiment

Figure 1:
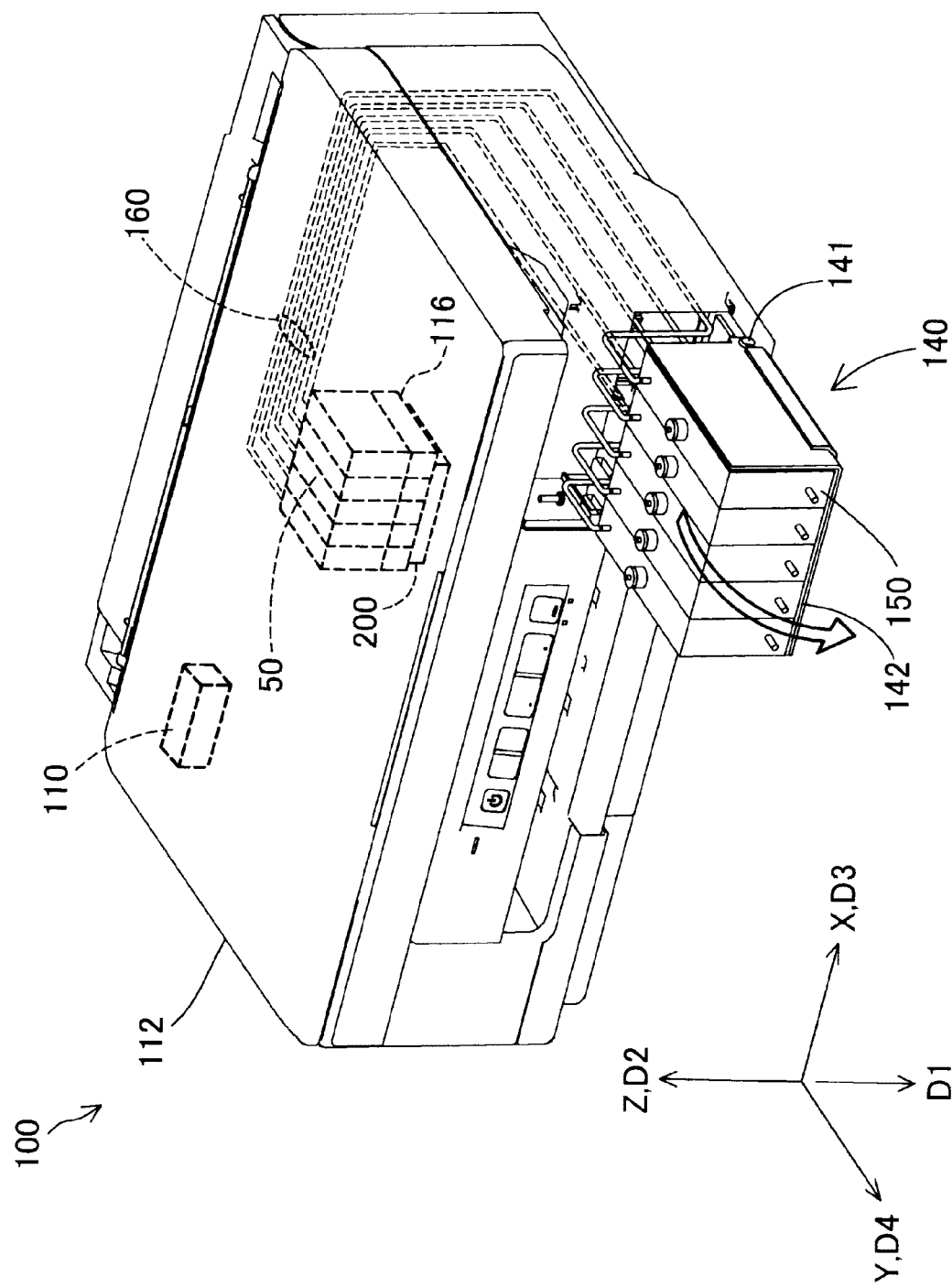
FIG. 1 is an explanatory diagram illustrating a schematic configuration of a liquid ejecting apparatus including a liquid ejecting head.

FIG. 1 is an explanatory diagram illustrating a schematic configuration of a liquid ejecting apparatus 100 including a liquid ejecting head 200 according to a first embodiment. In FIG. 1, arrows are illustrated along X, Y, and Z directions that are orthogonal to each other. The X direction and the Y direction are the directions along a horizontal direction, and the Z direction is the direction along a vertical direction. In this specification, the −Z direction is also referred to as a first direction D1, the +Z direction is also referred to as a second direction D2, the +X direction is also referred to as a third direction D3, and the +Y direction is also referred to as a fourth direction D4. Also in other drawings, the arrows along the X, Y, and Z directions are appropriately represented. The X, Y, and Z directions in FIG. 1 and the X, Y, and Z directions in other drawings represent the same direction.

The liquid ejecting apparatus 100 is an ink jet printer that prints an image on a print medium by ejecting an ink as a liquid. The liquid ejecting apparatus 100 receives image data from a computer (not illustrated) or the like, and converts the received image data into print data indicating on/off of dots on a print medium. The liquid ejecting apparatus 100 ejects an ink on the print medium based on the print data to form dots at various positions on the print medium, thereby printing an image on the print medium.

The liquid ejecting apparatus 100 is provided with a housing 112. The housing 112 accommodates a control portion 110, an ink tank 150, a tube 160, a pressure regulating valve 50, a carriage 116, and the liquid ejecting head 200. In FIG. 1, the internal configuration of the liquid ejecting apparatus 100 is represented by a broken line. In another aspect, a portion of the above configuration may be disposed outside the housing 112.

The housing 112 has a substantially rectangular parallelepiped shape. The housing 112 is provided with a front surface, a rear surface, a left side surface, a right side surface, a top surface, and a bottom surface. In the present embodiment, the housing 112 is disposed with the front surface facing the fourth direction D4.

The control portion 110 is formed by a computer including one or more processors, a main storage device, and an input/output interface that inputs and outputs signals to and from the outside. The control portion 110 controls each mechanism provided in the liquid ejecting apparatus 100 to eject an ink onto a print medium and print an image on the print medium. Specifically, the control portion 110 converts the received image data to generate print data. The control portion 110 controls a transport mechanism that transports the print medium according to the generated print data to transport the print medium in the sub scanning direction. The control portion 110 transports the print medium, controls the liquid ejecting head 200 and the carriage 116 on which the liquid ejecting head 200 is mounted according to the print data, and causes the liquid ejecting head 200 to eject the ink onto the print medium while moving the carriage 116 along the main scanning direction intersecting the sub scanning direction. In the present embodiment, the main scanning direction is the direction along the X direction, and the sub scanning direction is the direction along the Y direction.

The ink tank 150 stores the ink to be supplied to the liquid ejecting head 200. In the present embodiment, five ink tanks 150 that store inks of different colors are detachably attached to an accommodation portion 142 provided in an accommodation mechanism 140. The ink tank 150 is accommodated inside the housing 112 by the accommodation mechanism 140 when the liquid ejecting apparatus 100 is in use. When the user fills the ink into the ink tank 150, the user operates the accommodation mechanism 140 to expose the ink tank 150 to the outside of the housing 112. In FIG. 1, the state where the ink tank 150 is exposed to the outside of the housing 112 is illustrated. The liquid ejecting apparatus 100 may be provided with an ink cartridge capable of storing the ink instead of the ink tank 150. The ink tank 150 or the ink cartridge functions as a portion of a liquid supply portion that supplies the ink to the liquid ejecting head 200.

The accommodation mechanism 140 includes a plate-shaped accommodation portion 142 that forms a portion of the housing 112, and a hinge 141 that fixes the accommodation portion 142 to the housing 112. The accommodation portion 142 is a substantially rectangular member that constitutes a portion of the front surface of the housing 112 in the use state and accommodates the ink tank 150 inside the housing 112. The ink tank 150 is exposed to the outside of the liquid ejecting apparatus 100 by rotating in the direction illustrated by the arrow, starting from a portion where the accommodation portion 142 is fixed by the hinge 141. In another aspect, for example, the ink tank 150 may not be accommodated inside the housing 112 and may be exposed to the outside of the housing 112 in a used state.

The tube 160 functions as a portion of a liquid supply portion that supplies the ink in the ink tank 150 to the liquid ejecting head 200. The tube 160 forms a flow path for flowing the ink from the ink tank 150 toward the liquid ejecting head 200. In the present embodiment, the tube 160 couples the ink tank 150 and the pressure regulating valve 50. The tube 160 is formed of a flexible member such as synthetic rubber.

The pressure regulating valve 50 is provided in the middle of the flow path through which the ink flows, and includes a valve that opens and closes the flow path. Five pressure regulating valves 50 are provided corresponding to each of the five ink tanks 150. The pressure regulating valve 50 is provided between the ink tank 150 and the liquid ejecting head 200, and regulates the pressure of the ink supplied from the ink tank 150 to the liquid ejecting head 200.

In the middle of the ink tank 150 or the tube 160, which is disposed on the upstream of the pressure regulating valve 50, a pressure-feeding unit is provided that pressure-feeds the ink in the ink tank 150 toward the liquid ejecting head 200. The pressure-feeding unit functions as a portion of a liquid supply portion that supplies the ink in the ink tank 150 to the liquid ejecting head 200. Examples of the pressure-feeding unit include a pressing unit that presses the ink tank 150 from the outside, a pressure pump, and the like. As another embodiment, the ink may be supplied to the liquid ejecting head 200 by using a hydraulic head pressure difference generated by adjusting the relative position of the liquid ejecting head 200 and the ink tank 150 in the direction of gravity, instead of the pressure-feeding unit. In this case, the configuration including at least the ink tank 150 and the tube 160 functions as a liquid supply portion.

The carriage 116 holds the liquid ejecting head 200. The carriage 116 moves under the control of the control portion 110, and the liquid ejecting head 200 also moves as the carriage 116 moves. The carriage 116 is attached to a carriage guide (not illustrated). The carriage 116 can reciprocate in the main scanning direction X by receiving a force transmitted from a belt driven by rotation of a motor and moving along the carriage guide.

The liquid ejecting head 200 is mounted on the carriage 116. The ink supplied from the ink tank 150 to the liquid ejecting head 200 is ejected from the liquid ejecting head 200 onto the print medium in the form of droplets. The liquid ejecting head 200 is electrically coupled to the control portion 110 via a cable (not illustrated).

Figure 2:
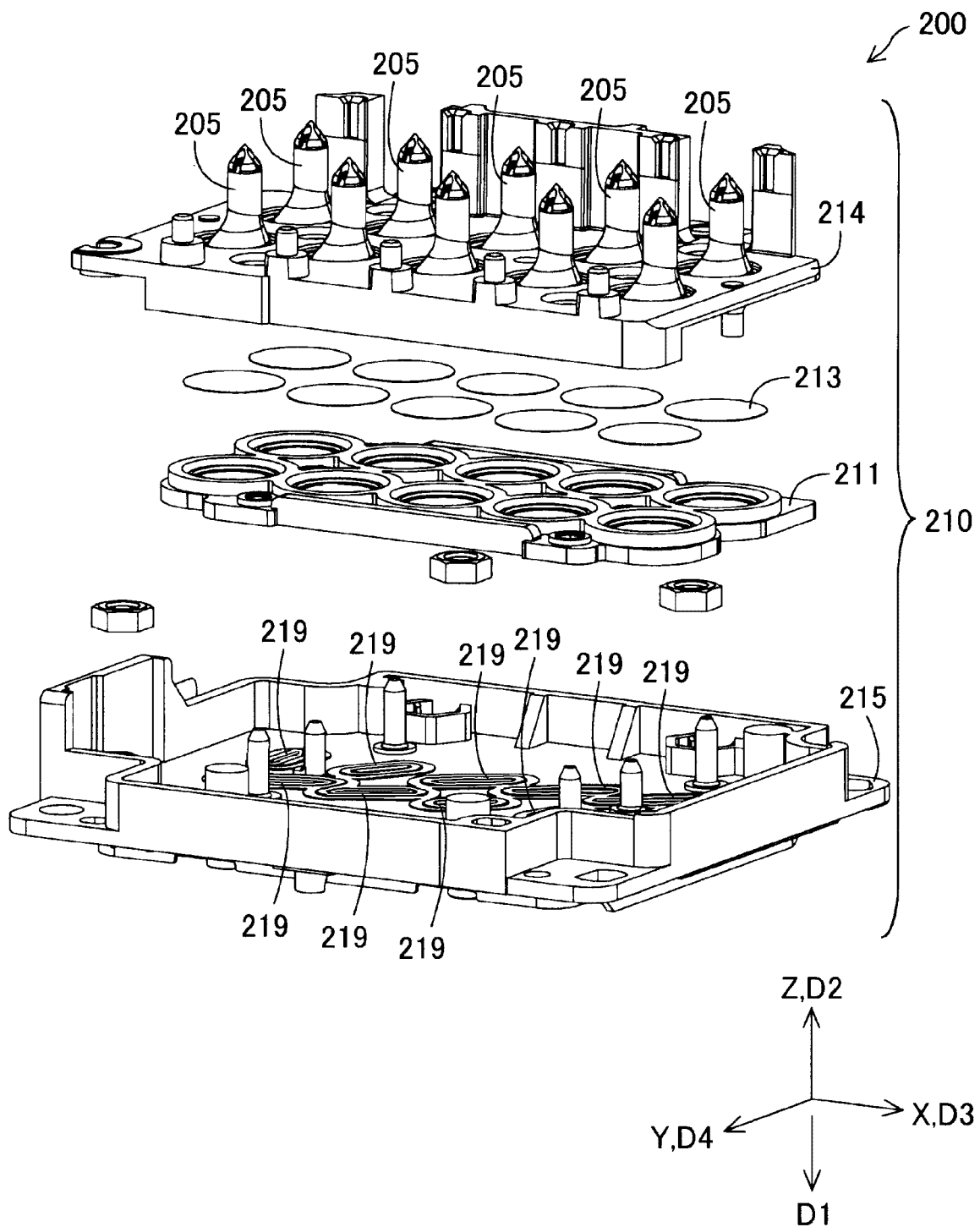
FIG. 2 is an exploded perspective view of the liquid ejecting head illustrating components of a holder.
Figure 3:
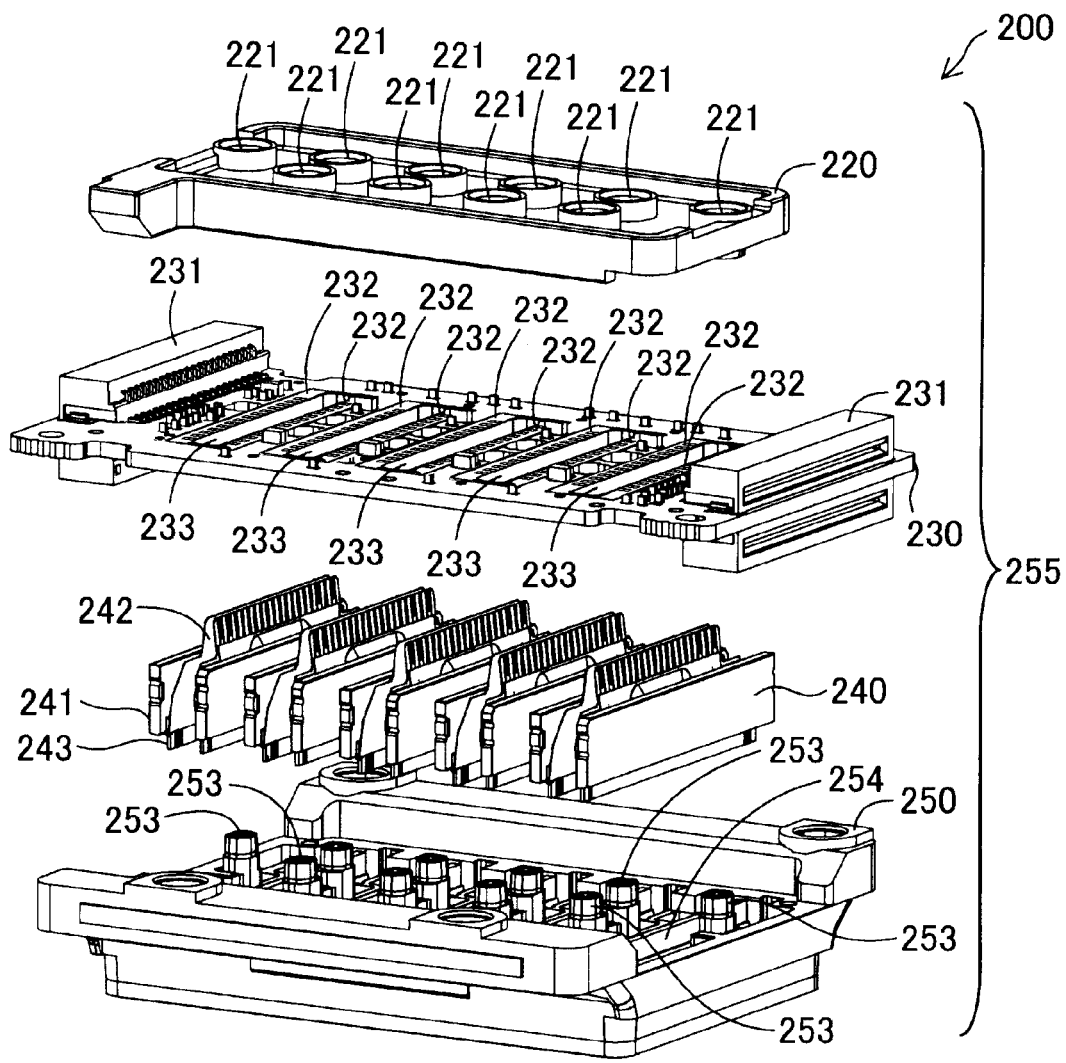
FIG. 3 is an exploded perspective view of the liquid ejecting head illustrating components of a case.
Figure 4:
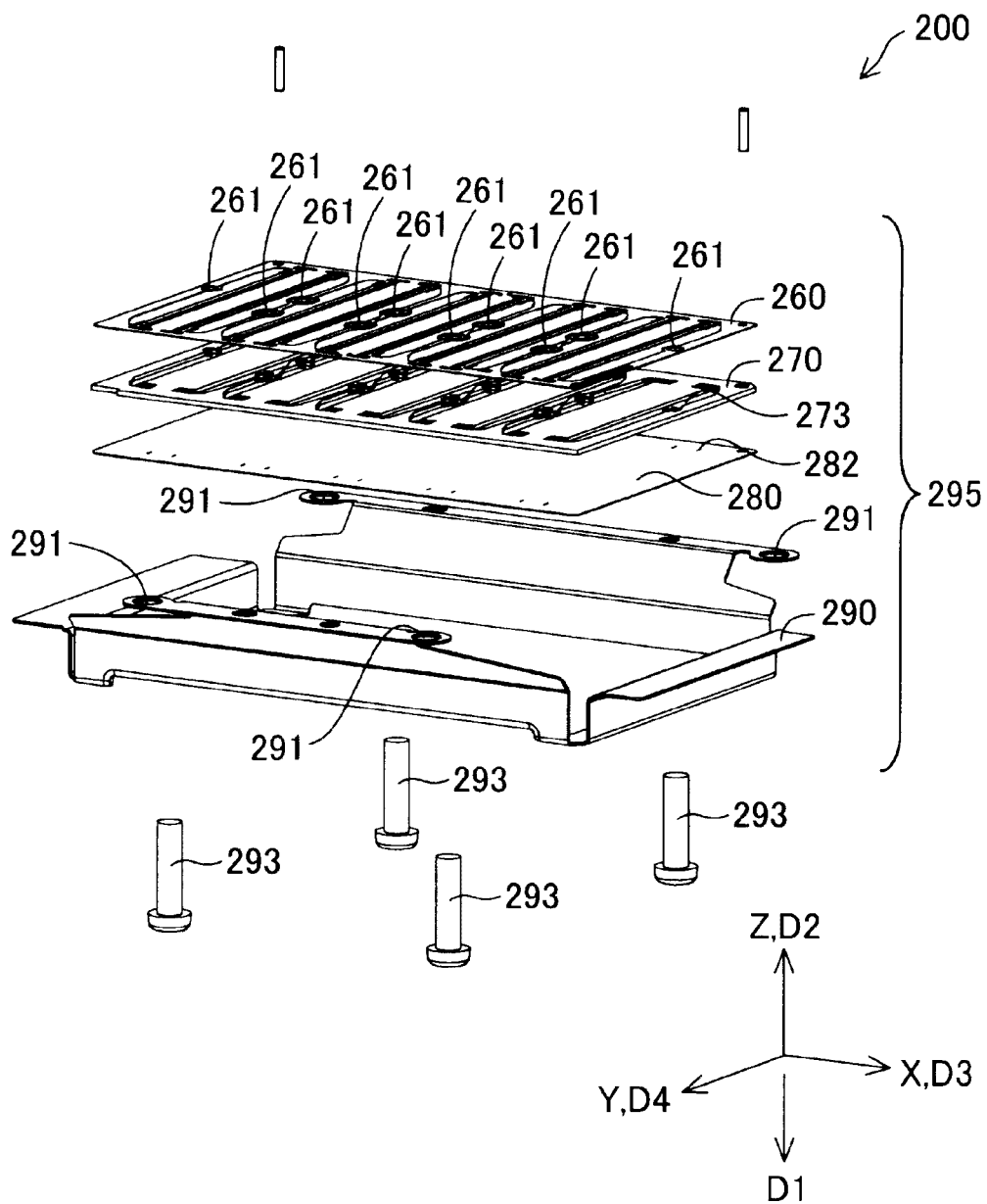
FIG. 4 is an exploded perspective view of the liquid ejecting head illustrating components of a cover.

FIGS. 2, 3 and 4 are exploded perspective views illustrating schematic configurations of the liquid ejecting head 200. FIG. 2 is an exploded perspective view of the liquid ejecting head 200 illustrating the components of a holder 210. FIG. 3 is an exploded perspective view of the liquid ejecting head 200 illustrating the components of a case 255. FIG. 4 is an exploded perspective view of the liquid ejecting head 200 illustrating the components of a cover 295. The liquid ejecting head 200 is provided with the holder 210, the case 255, and the cover 295 in order along the first direction D1. The liquid ejecting head 200 is configured by laminating these components and fastening the components with four screws 293 illustrated in FIG. 4.

With reference to FIG. 2, the holder 210 is provided with a mounting portion 214, a filter 213, a seal 211, and a holder main body 215. The holder 210 causes the ink supplied from the ink tank 150 via the tube 160 and the pressure regulating valve 50 to flow into the case 255 illustrated in FIG. 3.

The mounting portion 214 is a member on which the pressure regulating valve 50 is mounted. The mounting portion 214 is provided with ten ink supply needles 205. The ink supply needle 205 is provided with a through-hole that penetrates the ink supply needle 205 in the Z direction. The ink can flow through the inside of the ink supply needle 205 in the first direction D1 using the through-hole as a flow path. The ink supply needle 205 functions as a liquid introduction portion that introduces the ink, which is supplied from the ink tank 150 via the tube 160 and the pressure regulating valve 50, into the liquid ejecting head 200.

The seal 211 is a plate-shaped member and is provided with ten through-holes penetrating in the Z direction. The seal 211 liquid-tightly seals between the mounting portion 214 and the holder main body 215 in a portion other than the through-hole provided in the seal 211. The ink introduced from the ink supply needle 205 of the mounting portion 214 via the through-hole provided in the seal 211 flows into a first supply flow path 219 inside the holder main body 215.

The filter 213 is a member having a substantially disc shape, and is disposed between the mounting portion 214 and the seal 211 so as to overlap the through-hole provided in the seal 211. The filter 213 removes air bubbles and foreign matter contained in the ink supplied from the ink tank 150, and filters the ink. That is, the ink is filtered by the filter 213 and flows into the first supply flow path 219 upstream of the first supply flow path 219. As the filter 213, a sheet-like member in which a plurality of fine holes are formed by finely knitting fibers such as metal or resin, or a plate-shaped member such as a metal or resin through which a plurality of fine holes are penetrated can be used.

The first supply flow path 219 for supplying the ink to a nozzle 282 illustrated in FIG. 4 is provided inside the holder main body 215. When the holder main body 215 is viewed along the first direction D1, the holder main body 215 has a substantially rectangular shape with the third direction D3 as the longitudinal direction and the fourth direction D4 as the lateral direction.

Figure 5:
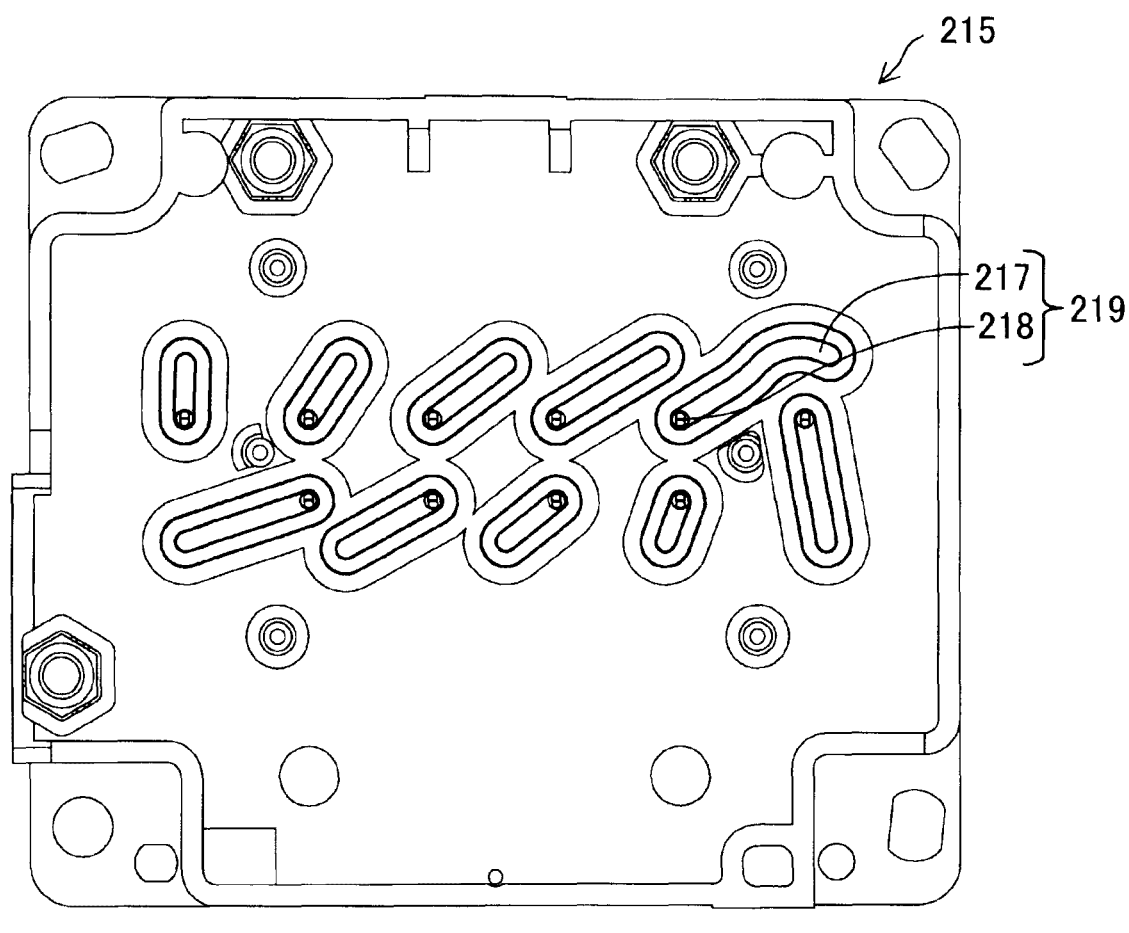
FIG. 5 is a plan view of a holder main body when viewed along a first direction.

FIG. 5 is a plan view of the holder main body 215 when viewed along the first direction D1. The first supply flow path 219 includes a horizontal flow path 217 that extends in the horizontal direction and a vertical flow path 218 that communicates with a groove portion and extends in the vertical direction. In the holder 210, the ink introduced from the ink supply needle 205 is filtered by the filter 213 and flows into the first supply flow path 219 via the through-hole of the seal 211. The first supply flow path 219 supplies the ink to a first ink inlet 221 provided in a first seal member 220 illustrated in FIG. 3.

With reference to FIG. 3, the case 255 is provided with the first seal member 220, a circuit substrate 230, an actuator unit 240, and a case main body 250. The case 255 is provided between the holder 210 and the cover 295 illustrated in FIG. 4. The case 255 supplies the ink supplied from the holder 210 to a flow path forming member 270 provided on the cover 295.

The first seal member 220 is a substantially rectangular plate-shaped member that is disposed between the holder 210 illustrated in FIG. 2 and the case main body 250 and is elongated in the X direction. Ten first ink inlets 221 are formed in the first seal member 220. The first seal member liquid-tightly seals between the holder 210 and the case main body 250 in a portion other than the first ink inlet 221. The ink supplied from the first supply flow path 219 to the first ink inlet 221 flows to a second supply flow path 253 in the case main body 250 via the first ink inlet 221.

The circuit substrate 230 is a substantially rectangular plate-shaped member that is elongated in the X direction. Specifically, when the circuit substrate 230 is viewed along the first direction D1, the outer shape of the circuit substrate 230 is a substantially rectangular shape with the third direction D3 as the longitudinal direction and the fourth direction D4 as the lateral direction. The circuit substrate 230 is fixed to the surface of the case main body 250 on the second direction D2 side with an adhesive, and is disposed between the holder 210 and the case main body 250.

The circuit substrate 230 is provided with a circuit for driving the liquid ejecting head 200. Specifically, the circuit substrate 230 is an electronic substrate on which wirings and circuit elements for driving a piezoelectric body 243 included in an actuator unit 240 described later are integrated. The circuit substrate 230 is provided with ten through-holes (not illustrated), ten sets of coupling terminals 232, and two connector units 231.

The ten through-holes provided in the circuit substrate 230 are provided at positions overlapping the first ink inlets 221 of the first seal member 220 when the circuit substrate 230 is viewed along the second direction D2, and at positions overlapping the second supply flow path 253 of the case main body 250 when the circuit substrate 230 is viewed along the first direction D1, respectively.

A pair of connector units 231 are provided at both ends of the circuit substrate 230 in the third direction D3. With such a configuration, the distance from the connector unit 231 to each circuit on the circuit substrate 230 can be shortened as a whole. One connector unit 231 is provided with one connector on each of the one surface and the other surface of the circuit substrate 230. That is, the circuit substrate 230 is provided with four connectors. The circuit substrate 230 is electrically coupled to the control portion 110 illustrated in FIG. 1 via a cable (not illustrated) coupled to the connector unit 231.

The actuator unit 240 is provided with a chip on film (COF) substrate 242, a fixed plate 241, and a piezoelectric body 243. The fixed plate 241 is fixed to a wall surface of the case main body 250 that defines an accommodation space 254. The COF substrate 242 is provided with a drive circuit for driving the piezoelectric body 243. An end portion of the COF substrate 242 in the first direction D1 is coupled to the piezoelectric body 243. The end portion of the COF substrate 242 on the second direction D2 side is inserted into an opening 233 of the circuit substrate 230 and coupled to the coupling terminal 232 of the circuit substrate 230.

The piezoelectric body 243 constitutes a piezoelectric element which is a passive element utilizing the piezoelectric effect. The piezoelectric element is driven according to the drive signal from the control portion 110. The piezoelectric body 243 is fixed to a support plate of a vibrating plate 260 so that the end portion on the first direction D1 side is a free end. The piezoelectric body 243 is fixed to the end portion of the fixed plate 241 on the first direction D1 side so that the end portion on the second direction D2 side is a fixed end.

The case main body 250 holds the first seal member 220, the circuit substrate 230, and the actuator unit 240.

The case main body 250 is provided with five accommodation spaces 254 and ten second supply flow paths 253. The accommodation space 254 is formed to include recessed portions provided along the Y direction and opening in the second direction D2, respectively. The accommodation space 254 accommodates the actuator unit 240. The five accommodation spaces 254 are provided side by side in the X direction.

The second supply flow path 253 is a substantially cylindrical member that protrudes from a bottom surface of the case main body 250 in the second direction D2. The ten second supply flow paths 253 are respectively provided at positions not overlapping the five accommodation spaces 254 when the case main body 250 is viewed along the first direction D1. The second supply flow path 253 communicates with a second ink inlet 261 provided in the vibrating plate 260 illustrated in FIG. 4. Furthermore, when the first seal member 220, the circuit substrate 230, the actuator unit 240, and the case main body 250 are combined, the second supply flow path 253 penetrates the through-hole provided in the circuit substrate 230 and is coupled to the first ink inlet 221 of the first seal member 220. That is, the second supply flow path 253 functions as a flow path that causes the ink supplied to the first ink inlet 221 to flow to the second ink inlet 261.

Referring to FIG. 4, the cover 295 is provided with the vibrating plate 260, the flow path forming member 270, a nozzle plate 280, and a cover main body 290.

The vibrating plate 260 is a substantially rectangular plate-shaped member elongated in the X direction. The vibrating plate 260 is provided between the case main body 250 and the flow path forming member 270 illustrated in FIG. 3. For example, the vibrating plate 260 is formed by laminating an elastic film made of an elastic member such as a resin film and a support plate made of a metal material such as stainless steel (SUS) for supporting the elastic film. The elastic film is supported by being joined to the surface of the support plate on the −Z direction side.

The vibrating plate 260 is elastically deformed by the piezoelectric body 243 of the actuator unit 240. As a result, the ink is ejected from a pressure chamber of the flow path forming member 270 via the nozzle 282. The vibrating plate 260 also functions as a wall surface that closes an opening provided on the surface of the flow path forming member 270 described later on the second direction D2 side.

The vibrating plate 260 is provided with a second ink inlet 261. The second ink inlet 261 is a through-hole penetrating the vibrating plate 260 in the Z direction. The second ink inlet 261 communicates with the second supply flow path 253 of the case main body 250 and the third supply flow path 273 provided in the flow path forming member 270, and causes the ink to flow into the third supply flow path 273.

The flow path forming member 270 is a plate-shaped member having an outer shape that matches the outer shape of the vibrating plate 260. The flow path forming member 270 is provided between the vibrating plate 260 and the nozzle plate 280. The flow path forming member 270 is provided with the third supply flow path 273. The flow path forming member 270 is provided with the pressure chamber (not illustrated). In the present embodiment, the flow path forming member 270 is made of silicon (Si), for example. The flow path forming member 270 may have a configuration in which a plurality of substrates are laminated.

The nozzle plate 280 is a thin plate member having an outer shape that matches the outer shapes of the vibrating plate 260 and the flow path forming member 270. The nozzle plate 280 is provided on the first direction D1 side of the flow path forming member 270. The nozzle plate 280 is provided with a plurality of nozzles 282 that eject the liquid in the first direction D1. More specifically, the nozzle plate 280 is provided with ten nozzle rows each of which includes a plurality of nozzles 282 arranged in the Y direction. In FIG. 4, a portion of the nozzles 282 forming the nozzle row is omitted.

The nozzle 282 is a through-hole penetrating the nozzle plate 280 in the Z direction. Each nozzle 282 is provided at a position corresponding to the pressure chamber of the flow path forming member 270. The ink in the pressure chamber of the flow path forming member 270 is ejected onto the print medium via the nozzle 282. The nozzle plate 280 functions as a wall surface that closes the opening provided in the surface of the flow path forming member 270 in the first direction D1 in the portion where the nozzle 282 is not provided. The nozzle plate 280 is made of, for example, stainless steel (SUS), silicon (Si), or the like.

The cover main body 290 is a frame that accommodates the vibrating plate 260, the flow path forming member 270, and the nozzle plate 280. The cover main body 290 is provided with an opening that exposes a surface of the nozzle plate 280 on the first direction D1 side when the vibrating plate 260, the flow path forming member 270, and the nozzle plate 280 are accommodated in the cover main body 290. The cover main body 290 is provided with the four through-holes 291 into which four screws 293 are inserted.

The vibrating plate 260, the flow path forming member 270, and the nozzle plate 280 are adhered to each other with an adhesive. In addition, the case 255 and the cover 295 are adhered to each other by adhering the case main body 250 and the vibrating plate 260 with an adhesive. Specifically, the surface of the nozzle plate 280 on the second direction D2 side and the surface of the flow path forming member 270 on the first direction D1 side are stuck to each other with an adhesive. In addition, the surface of the flow path forming member 270 on the second direction D2 side and the surface of the vibrating plate 260 on the first direction D1 side are stuck to each other with an adhesive. The surface of the vibrating plate 260 on the second direction D2 side and the surface of the case main body 250 on the first direction D1 side are stuck to each other with an adhesive.

Each of the members configuring the liquid ejecting head 200 illustrated in FIGS. 2 to 4 constitute the liquid ejecting head 200 by being laminated and fastened. Specifically, the cover main body 290 is fixed to the holder 210 by the four screws 293, with the above members laminated between the cover main body 290 and the holder 210 being pinched therebetween. The case main body 250 and the circuit substrate 230 are also provided with screw holes into which the four screws 293 are inserted. The four screws 293 penetrate through the screw holes provided in the case main body 250 and the circuit substrate 230 when fixing the cover main body 290 to the holder 210.

Figure 6:
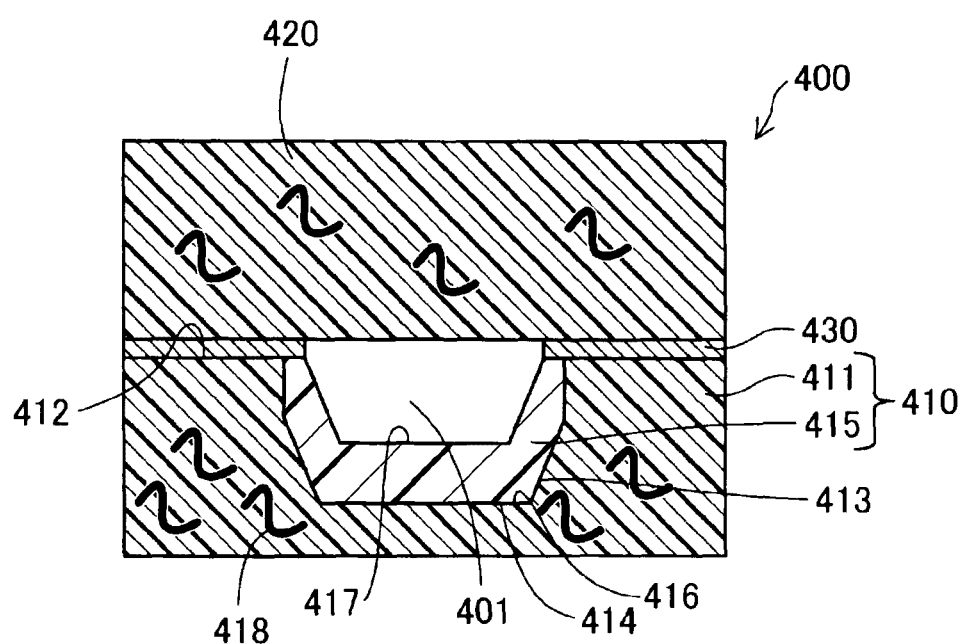
FIG. 6 is an explanatory diagram illustrating a schematic configuration of a flow path structure according to a first embodiment.

FIG. 6 is an explanatory diagram illustrating a schematic configuration of a flow path structure 400 according to the first embodiment. The flow path structure 400 is provided with a first flow path member 410 and a second flow path member 420. The flow path structure 400 includes therein a first flow path 401 which is a liquid flow path. FIG. 6 illustrates a cross section of the flow path structure 400 on a plane intersecting the extending direction of the first flow path 401. The flow path structure 400 can constitute the first supply flow path 219 illustrated in FIG. 5, for example. When the flow path structure 400 constitutes the first supply flow path 219, the first flow path 401 corresponds to the horizontal flow path 217. The flow path structure 400 is not limited to the first supply flow path 219, and other flow paths can be constituted.

The first flow path member 410 is formed by laminating the second flow path member 420 on the first flow path member 410. By laminating the second flow path member 420 on the first flow path member 410, the first flow path 401 is formed inside the flow path structure 400. Specifically, the first flow path member 410 and the second flow path member 420 are adhered to each other via an adhesive layer 430 made of an adhesive. The direction where the second flow path member 420 is laminated on the first flow path member 410 may be referred to as a laminating direction.

The first flow path member 410 is provided with a first resin member 411 made of resin and a first film member 415 having a film. The first resin member 411 includes a first front surface 412 that faces the second flow path member 420. The first front surface 412 is provided with a first recessed portion 413 that is a portion recessed in a direction away from the second flow path member 420 in the laminating direction. When the term "first front surface 412" is used in this specification, the front surface of the first recessed portion 413 is not included in the first front surface 412. The front surface inside the first recessed portion 413 may be referred to as a first recessed portion front surface 414. Details of the materials forming the first resin member 411 and the first film member 415 will be described later. In addition, in the present embodiment, the second flow path member 420 is made of the same resin material as that of the first resin member 411.

The first film member 415 includes a first surface 416 and a second surface 417 opposite to the first surface 416. Specifically, the first surface 416 is a surface closer to the first resin member 411 than the second surface 417 in the laminating direction, and the second surface 417 is a surface farther from the first resin member 411 than the first surface 416 in the laminating direction.

At least a portion of the first surface 416 is in close contact with the first recessed portion front surface 414. In the present specification, "close contact" means that a plurality of members are directly fixed to each other. For example, a state where two members are fixed to each other via an adhesive is called a "fixed" state or an "adhesive" state, but not a "close contact" state.

In the present embodiment, a modified polyphenylene ether (m-PPE) resin is used as the first resin member 411. In addition, the first resin member 411 according to the present embodiment is a resin to which silica glass fiber is added as a filler 418 for the purpose of improving strength. In other embodiments, the first resin material may be another type of resin material such as ABS, for example. In addition, as the filler 418, for example, carbon fiber or silica glass flakes may be used.

The film used as the first film member 415 in the present embodiment is a thin film member having a thickness of 5 μm or more and 100 μm or less. The film may be made of a single layer or may be made of a plurality of layers. Since the first film member 415 is not added with a filler for the purpose of improving strength, the first film member 415 contains substantially no filler.

The second surface 417 of the first film member 415 and the second flow path member 420 define at least a portion of the first flow path 401 in a region overlapping the first recessed portion 413 in the laminating direction. Specifically, in the present embodiment, the first flow path 401 is defined by the second surface 417, the second flow path member 420, and the adhesive layer 430. The cross-sectional shape of the first flow path 401 according to the present embodiment is a substantially hexagonal shape, and may be another shape such as a hexagon, a circle, an ellipse, a semi-circle, and a semi-ellipse other than a trapezoid, a rectangle, a polygon.

In the present embodiment, a film made of polyethylene terephthalate resin is used in order to improve the solvent resistance of the first film member 415. In addition, the gas barrier property of the first film member 415 is higher than the gas barrier property of the first resin member 411. In the present embodiment, the film forming the first film member 415 contains a polyglycolic acid resin to improve the gas barrier property of the film. The solvent resistance means the resistance of the member to the organic solvent. The gas barrier property refers to the property of the member to block the gas. The high gas barrier property can also be said to indicate that the gas permeability of the member is low. The gas permeability refers to the degree to which the gas of the member passes.

In order to improve the solvent resistance of the first film member 415, it is preferable to use a film having high solvent resistance. Specifically, it is preferable to use a film containing at least one of a polyethylene terephthalate resin, a polyethylene naphthalate resin, a high-density polyethylene resin, and a vinyl chloride resin, which generally have high solvent resistance. By using the first film member 415 having high solvent resistance, in particular, when the liquid flowing in the flow path structure 400 is an organic solvent-based ink, it is possible to effectively prevent the first flow path member 410 from being deteriorated by the ink.

The organic solvent-based ink is an ink in which the main component of the solvent is an organic solvent, and is also referred to as a solvent ink or a non-aqueous ink. The organic solvent-based ink is an ink containing any one or more of glycol ethers, glycol ether esters, dibasic acid esters, ester-based solvents, hydrocarbon-based solvents, and alcohol-based solvents.

Examples of the glycol ether-based solvent include alkylene glycol monoether, alkylene glycol diether, and the like.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, diethylene glycol monobenzyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, pentaethylene glycol monomethyl ether, pentaethylene glycol monoethyl ether, pentaethylene glycol monobutyl ether, propylene glycol monomethyl ether, propylene glycol monoethyl ether, dipropylene glycol monomethyl ether, dipropylene glycol monoethyl ether, and the like.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

In addition, examples of glycol ether esters include ethylene glycol monomethyl ether acetate, ethylene glycol monoethyl ether acetate, ethylene glycol monopropyl ether acetate, ethylene glycol monobutyl ether acetate, propylene glycol monomethyl ether acetate, propylene glycol monoethyl ether acetate, propylene glycol monopropyl ether acetate, propylene glycol monobutyl ether acetate, dimethylene glycol monomethyl ether acetate, dimethylene glycol monoethyl ether acetate, dimethylene glycol monopropyl ether acetate, dimethylene glycol monobutyl ether acetate, diethylene glycol monomethyl ether acetate, diethylene glycol monoethyl ether acetate, diethylene glycol monopropyl ether acetate, diethylene glycol monobutyl ether acetate, dipropylene glycol monomethyl ether acetate, dipropylene glycol monoethyl ether acetate, dipropylene glycol monopropyl ether acetate, dipropylene glycol monobutyl ether acetate, trimethylene glycol monomethyl ether acetate, trimethylene glycol monoethyl ether acetate, trimethylene glycol monopropyl ether acetate, trimethylene glycol monobutyl ether acetate, triethylene glycol monomethyl ether acetate, triethylene glycol monoethyl ether acetate, triethylene glycol monopropyl ether acetate, triethylene glycol monobutyl ether acetate, tripropylene glycol monomethyl ether acetate, tripropylene glycol monoethyl ether acetate, tripropylene glycol monopropyl ether acetate, tripropylene glycol monobutyl ether acetate, 3-methoxybutyl acetate, and 3-methoxy-3-methyl-1-butyl acetate.

Examples of dibasic acid esters include monoesters and diesters of dicarboxylic acids (for example, aliphatic dicarboxylic acids such as glutaric acid, adipic acid, and succinic acid). Specifically, dimethyl-2-methylglutarate and the like can be mentioned.

Examples of the ester-based solvent include methyl acetate, ethyl acetate, n-propyl acetate, isopropyl acetate, n-butyl acetate, isobutyl acetate, isopentyl acetate, sec-butyl acetate, amyl acetate, methoxybutyl acetate, methyl lactate, ethyl lactate, butyl lactate, methyl caprylate, methyl laurate, isopropyl laurate, isopropyl myristate, isopropyl palmitate, isooctyl palmitate, isostearyl palmitate, methyl oleate, ethyl oleate, isopropyl oleate, butyl oleate, methyl linoleate, isobutyl linoleate, ethyl linoleate, isopropyl isostearate, soybean oil methyl, soybean oil isobutyl, tall oil methyl, tall oil isobutyl, diisopropyl adipate, diisopropyl sebacate, diethyl sebacate, propylene glycol monocaprate, tris(2-ethylhexanoic acid)trimethylolpropane, tris(2-ethylhexanoic acid)glyceryl, ethylene glycol monomethyl ether acetate, ethylene glycol monoethyl ether acetate, propylene glycol monomethyl ether acetate, propylene glycol monoethyl ether acetate, diethylene glycol monomethyl ether acetate, diethylene glycol monoethyl ether acetate, diethylene glycol monobutyl ether acetate, and the like.

Examples of hydrocarbon-based solvents include aliphatic hydrocarbons (for example, paraffin and isoparaffin), alicyclic hydrocarbons (for example, cyclohexane, cyclooctane, and cyclodecane), aromatic hydrocarbons (for example, benzene, toluene, xylene, naphthalene, and tetralin), and the like. As such a hydrocarbon-based solvent, a commercially available product may be used, and examples thereof include aliphatic hydrocarbons or alicyclic hydrocarbons such as IP Solvent 1016, IP Solvent 1620, IP Clean LX (all above are trade names manufactured by Idemitsu Kosan Co., Ltd.), Isopar G, Isopar L, Isopar H, Isopar M, Exxsol D40, Exxsol D80, Exxsol D100, Exxsol D130, Exxsol D140 (all above are trade names manufactured by Exxon Corporation), NS Clean 100, NS Clean 110, NS Clean 200, NS Clean 220 (all above are trade names of JXTG Energy Co., Ltd.), Naphthesol 160, Naphthesol 200, Naphthesol 220 (all above are trade names of JXTG Energy Co., Ltd.), and aromatic hydrocarbons such as Solvesso 200 (trade name manufactured by Exxon Corporation).

Examples of alcohol-based solvents include methanol, ethanol, isopropanol, 1-propanol, 1-butanol, 2-butanol, 3-pentanol, 2-methyl-1-butanol, 2-methyl-2-butanol, isoamyl alcohol, 3-methyl-2-butanol, 3-methoxy-3-methyl-1-butanol, 4-methyl-2-pentanol, allyl alcohol, 1-hexanol, 1-heptanol, 2-heptanol, 3-heptanol, isomyristyl alcohol, isopalmityl alcohol, isostearyl alcohol, oleyl alcohol, and the like.

It is also possible to measure the agent resistance of the member by experiment. Specifically, a member such as a film having a certain mass as a test piece is dipped in the target ink for a certain period of time, and the dissolution ratio is calculated from the change in mass at that time, so that the agent resistance can be quantitatively evaluated. By the above method, for example, the resistance of the member to a specific solvent ink or photocurable ink can be measured. The resistance of the member to a specific ink may be referred to as an ink resistance.

Here, the photocurable ink is, for example, a UV ink containing a monomer, an oligomer, or the like that undergoes a polymerization reaction and cures when irradiated with ultraviolet rays. The UV ink is also called an ultraviolet curable ink. Examples of the photocurable ink composition include an ink containing any of (meth)acrylates, (meth)acrylamides, and N-vinyl compounds as a polymerizable compound.

Examples of monofunctional (meth)acrylates include hexyl(meth)acrylate, 2-ethylhexyl(meth)acrylate, tert-octyl(meth)acrylate, isoamyl(meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl(meth)acrylate, 2-ethylhexyl diglycol (meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)acrylate, 3-methoxybutyl(meth)acrylate, alkoxymethyl(meth) acrylate, alkoxyethyl(meth)acrylate, 2-(2-methoxyethoxy)ethyl(meth)acrylate, 2-(2-butoxyethoxy)ethyl (meth) acrylate, 2,2,2-tetrafluoroethyl(meth)acrylate, 1H,1H,2H,2H-perfluorodecyl(meth)acrylate, 4-butylphenyl(meth)acrylate, phenyl(meth)acrylate, 2,4 5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)acrylate, glycidyloxypropyl(meth)acrylate, tetrahydrofurfuryl(meth)acrylate, hydroxyalkyl(meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, dimethylaminoethyl(meth)acrylate, diethylaminoethyl(meth)acrylate, dimethylaminopropyl(meth)acrylate, diethylaminopropyl(meth)acrylate, trimethoxysilylpropyl(meth) acrylate, dicyclopentenyl(meth)acrylate, dicyclopentenyloxyethyl(meth)acrylate, trimethoxysilylpropyl(meth)acrylate, trimethylsilylpropyl(meth)acrylate, polyethylene oxide monomethyl ether(meth)acrylate, oligoethylene oxide monomethyl ether(meth)acrylate, polyethylene oxide(meth) acrylate, oligoethylene oxide(meth)acrylate, oligoethylene oxide monoalkyl ether(meth)acrylate, polyethylene oxide monoalkyl ether(meth)acrylate, dipropylene glycol (meth) acrylate, polypropylene oxide monoalkyl ether(meth)acrylate, oligopropylene oxide monoalkyl ether(meth)acrylate, 2-methacryloyloxyethyl succinic acid, 2-methacryloyloxyhexahydrophthalic acid, 2-methacryloyloxyethyl-2-hydroxypropyl phthalate, butoxydiethylene glycol (meth)acrylate, trifluoroethyl(meth)acrylate, perfluorooctylethyl(meth) acrylate, 2-hydroxy-3-phenoxypropyl(meth)acrylate, EO-modified phenol(meth)acrylate, EO-modified cresol (meth)acrylate, EO-modified nonylphenol(meth)acrylate, PO-modified nonylphenol(meth)acrylate, and EO-modified 2-ethylhexyl (meth)acrylate.

Examples of polyfunctional (meth)acrylates include bifunctional (meth)acrylates such as 1,6-hexanediol di(meth)acrylate and 1,10-decanediol di(meth)acrylate, neopentyl glycol di(meth)acrylate, dipropylene glycol di(meth)acrylate (DPGD(M)A), tripropylene glycol di(meth)acrylate (TPGD(M)A), 2,4-dimethyl-1,5-pentanediol di(meth)acrylate, butylethylpropanediol di(meth)acrylate, ethoxylated cyclohexanemethanol di(meth)acrylate, triethylene glycol di(meth)acrylate (TEGD(M)A), polyethylene glycol di(meth)acrylate, oligoethylene glycol di(meth)acrylate, ethylene glycol di(meth)acrylate, 2-ethyl-2-butyl-butanediol di(meth)acrylate, hydroxypivalic acid neopentyl glycol di(meth) acrylate, dimethylol tricyclodecane di(meth)acrylate, EO-modified bisphenol A di(meth)acrylate, bisphenol F polyethoxy di(meth)acrylate, polypropylene glycol di(meth) acrylate, oligopropylene glycol di(meth)acrylate, 1,4-butanediol di(meth)acrylate, 2-ethyl-2-butyl-propanediol di(meth)acrylate, 1,9-nonanediol di(meth)acrylate, propoxy ethoxylated bisphenol A di(meth)acrylate, and tricyclodecane di(meth)acrylate.

Furthermore, examples of polyfunctional (meth)acrylates include trimethylolpropane tri(meth)acrylate, trimethylolethane tri(meth)acrylate, alkylene oxide-modified tri(meth) acrylate of trimethylolpropane, pentaerythritol tri(meth) acrylate, dipentaerythritol tri(meth)acrylate, trimethylolpropane tri((meth)acryloyloxypropyl) ether, isocyanuric acid alkylene oxide modified tri(meth)acrylate, dipentaerythritol propionate tri(meth)acrylate, tri((meth) acryloyloxyethyl)isocyanurate, hydroxypivalaldehyde-modified dimethylolpropane tri(meth)acrylate, sorbitol tri (meth)acrylate, propoxylated trimethylolpropane tri(meth) acrylate, ethoxylated glycerin tri(meth)acrylate: above trifunctional, pentaerythritol tetra(meth)acrylate, sorbitol tetra(meth)acrylate, ditrimethylolpropane tetra(meth)acrylate, dipentaerythritol tetra(meth)acrylate propionate, ethoxylated pentaerythritol tetra(meth)acrylate: above tetrafunctional, sorbitol penta(meth)acrylate, dipentaerythritol penta(meth)acrylate: above pentafunctional, dipentaerythritol hexa(meth)acrylate, sorbitol hexa(meth)acrylate, phosphazene alkylene oxide-modified hexa(meth)acrylate, caprolactone-modified dipentaerythritol hexa(meth)acrylate: above hexafunctional, and the like.

Examples of (meth)acrylamides include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth) acrylamide, N,N-dimethyl(meth)acrylamide, N,N-diethyl (meth)acrylamide, and (meth) acryloylmorpholine.

The N-vinyl compound has a structure in which a vinyl group is bonded to nitrogen (>N—CH=CH2). Specific examples of the N-vinyl compound include N-vinylformamide, N-vinylcarbazole, N-vinylindole, N-vinylpyrrole, N-vinylacetamide, N-vinylpyrrolidone, N-vinylcaprolactam, and their derivatives, and among these compounds, N-vinylcaprolactam is particularly preferable.

As the liquid flowing in the flow path structure 400, not only the organic solvent-based ink or the photocurable ink, but also a water-based ink in which a coloring material such as a dye or a pigment is dissolved in a water-based solvent may be used.

By increasing the gas barrier property of the first film member 415, it is possible to suppress evaporation and volatilization of the solvent, the volatile component, and the like contained in the liquid flowing in the first flow path 401. In order to improve the gas barrier property of the first film member 415, it is preferable to use a film having a low gas permeability. The gas permeability of the member can also be measured by the isobaric method. The isobaric method is a method in which an inert gas is filled in two indoor spaces separated by a diaphragm formed of a member as a sample at the same pressure and thereafter a test gas is injected into one indoor space to measure the speed at which the test gas permeates the sample and moves to the other indoor space.

Figure 7:
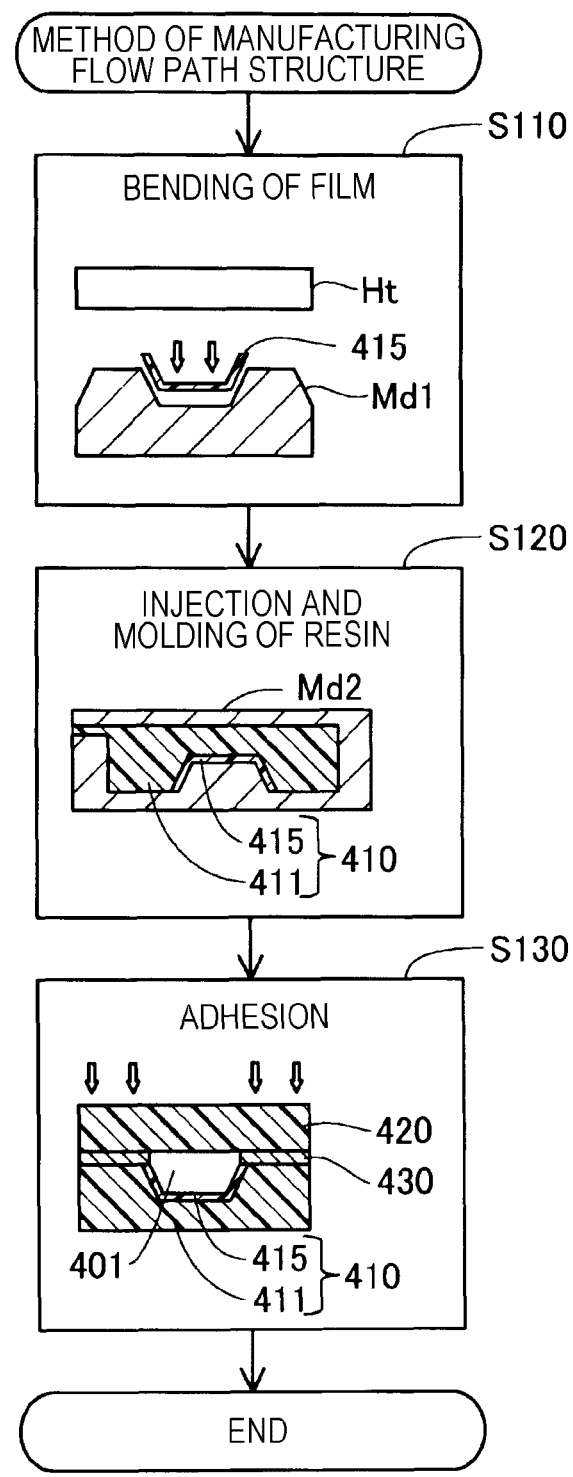
FIG. 7 is a process drawing illustrating a method of manufacturing the flow path structure according to the first embodiment.

FIG. 7 is a process drawing illustrating a method of manufacturing the flow path structure 400 according to the present embodiment.

First, in Step S110, the film is bent while being heated. Specifically, by deforming the film along a mold Md1 while being heated by a heater Ht, unevenness corresponding to the first recessed portion 413 of the first resin member 411 is formed on the film, and the first film member 415 is created. Depending on the shape of the first film member 415 to be created, the film may be processed after Step S110, such as cutting and removing the edge of the film.

In Step S120, the first film member 415 created in Step S110 is fixed to a molding die Md2, and resin is injected into the molding die Md2 to be molded. In Step S120, the first flow path member 410 in which the first film member 415 and the first resin member 411 are integrally molded is created so that the unevenness formed on the film and the first recessed portion 413 of the first resin material correspond to each other. That is, as illustrated in FIG. 6, at least a portion of the first surface 416 of the first film member 415 and the first recessed portion front surface 414 of the first resin member 411 are in close contact with each other.

In Step S130, the first flow path member 410 and the second flow path member 420 are adhered to each other with the adhesive layer 430. Specifically, the first flow path member 410 and the second flow path member 420 are adhered to each other so that the second surface 417 of the first film member 415 and the second flow path member 420 define at least a portion of the first flow path 401 in a region overlapping the first recessed portion 413 in the laminating direction. The flow path structure 400 is completed by the above Steps S110 to S130.

According to the flow path structure 400 according to the present embodiment described above, the second surface 417 of the first film member 415 and the second flow path member 420 define at least a portion of the first flow path 401 in a region overlapping the first recessed portion 413 in the laminating direction. As a result, the first flow path 401 is defined by the portion of the first flow path member 410 where the first resin member 411 is covered with the first film member 415. Therefore, burrs generated when the first resin member 411 is molded, the filler 418 contained in the first resin member 411, and the like are prevented from being exposed as foreign matter in the first flow path 401, and the foreign matter is prevented from being mixed into the liquid flowing in the first flow path 401.

In addition, in the present embodiment, the film forming the first film member 415 contains at least one of a polyethylene terephthalate resin, a polyethylene naphthalate resin, a high-density polyethylene resin, and a vinyl chloride resin. Therefore, the solvent resistance of the first film member 415 can be improved.

In addition, in the present embodiment, the gas barrier property of the first film member 415 is higher than the gas barrier property of the first resin member 411. Therefore, evaporation and volatilization of the solvent, volatile components, and the like contained in the liquid flowing in the first flow path 401 can be suppressed.

In addition, in the present embodiment, the first resin member 411 includes the filler 418. Therefore, the first film member 415 suppresses the filler 418 contained in the first resin member 411 from being exposed as foreign matter in the first flow path 401.

In addition, in the present embodiment, the first flow path member 410 is an integrally molded product of the first resin member 411 and the first film member 415. According to such a configuration, the first flow path member 410 can be formed without using a fixture or the like that brings the first resin member 411 and the first film member 415 into close contact with each other.

B. Second Embodiment

Figure 8:
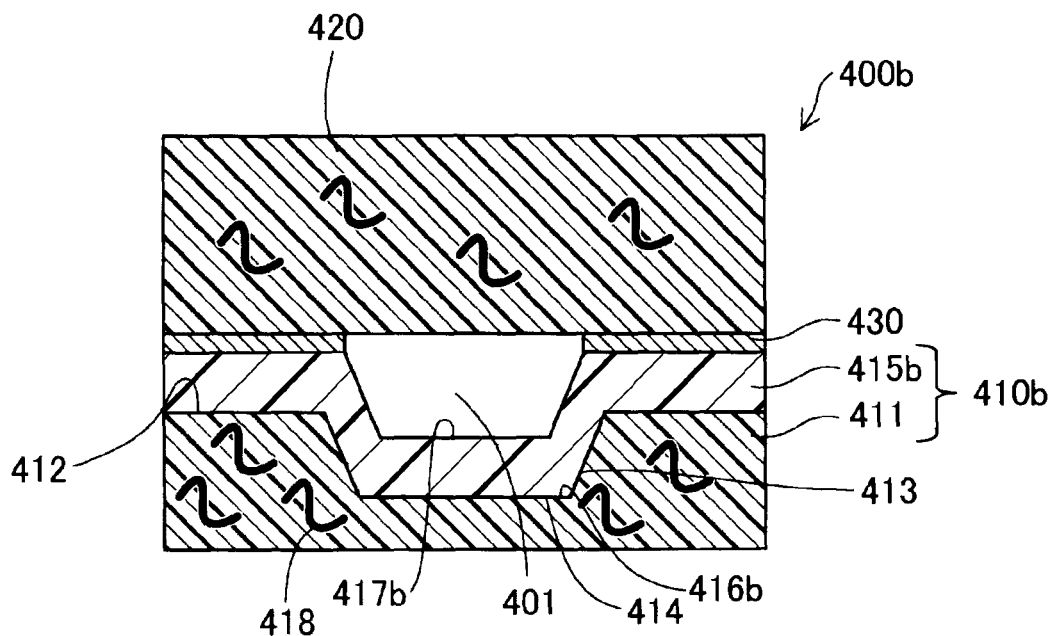
FIG. 8 is an explanatory diagram illustrating a schematic configuration of a flow path structure according to a second embodiment.

FIG. 8 is an explanatory diagram illustrating a schematic configuration of a flow path structure 400b according to a second embodiment. Similar to FIG. 6, FIG. 8 illustrates a cross section of the flow path structure 400b on a plane intersecting the extending direction of the first flow path 401. Unlike the first embodiment, a first surface 416b of a first film member 415b forming a first flow path member 410b is in close contact with not only the first recessed portion front surface 414 but also at least a portion of the first front surface 412. In the present embodiment, a second surface 417b of the first film member 415b and the second flow path member 420 of the first flow path member 410b are adhered to each other via the adhesive layer 430.

Also with the flow path structure 400b described above, the foreign matter adhering to the first resin member 411 is prevented from being exposed in the first flow path 401. In particular, in the present embodiment, the first film member 415b and the first resin member 411 are in close contact with not only the first recessed portion front surface 414 but also at least a portion of the first front surface 412, so that the adhesion between the first film member 415b and the first resin member 411 is improved.

C. Third Embodiment

Figure 9:
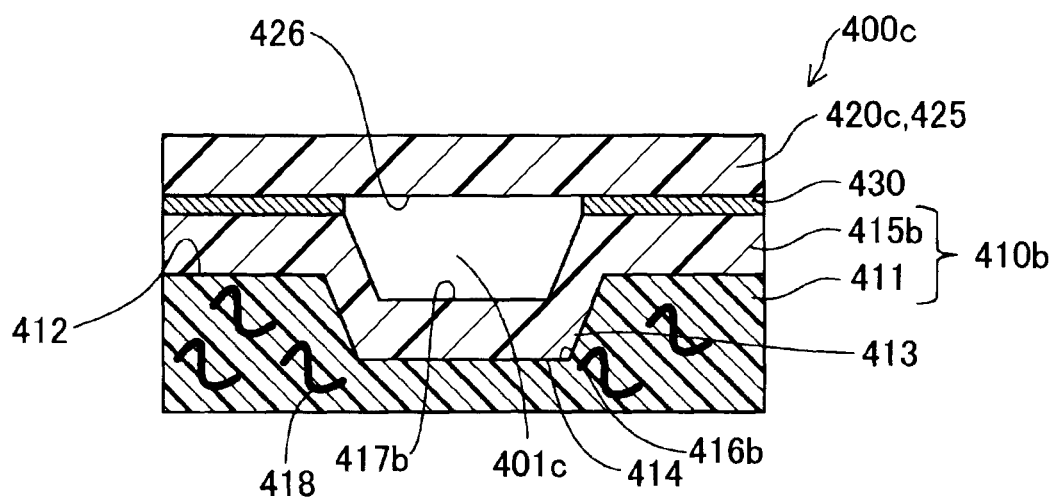
FIG. 9 is an explanatory diagram illustrating a schematic configuration of a flow path structure according to a third embodiment.

FIG. 9 is an explanatory diagram illustrating a schematic configuration of a flow path structure 400c according to a third embodiment. Similar to FIG. 8, FIG. 9 illustrates a cross section of the flow path structure 400c on a plane intersecting the extending direction of a first flow path 401c. In the flow path structure 400c, the first flow path member 410b has the same configuration as in the second embodiment. A second flow path member 420c is formed by a second film member 425 having a film.

The second film member 425 has a third surface 426 facing the first flow path member 410b in the laminating direction. The third surface 426 of the second film member 425 is adhered to the second surface 417b of the first film member 415b in a region overlapping the first front surface 412 in the laminating direction. That is, the first flow path member 410b and the second flow path member 420c are fixed by adhering the films to each other with the adhesive layer 430. The second surface 417 of the first film member 415 and the third surface 426 of the second film member 425 define the first flow path 401c in a region overlapping the first recessed portion 413 in the laminating direction. In the present embodiment, the surface of the second film member 425 opposite to the third surface 426 is not in contact with other members. That is, as viewed from the first flow path 401c, there is a space outside the flow path structure 400c at a position pinching the second film member 425.

As the film forming the second film member 425, the same film as the film forming the first film member 415b can be used. In the present embodiment, similar to the first film member 415b, a film made of a polyethylene terephthalate resin containing a polyglycolic acid resin is used as the second film member 425. By forming the film forming the first film member 415b and the film forming the second film member 425 with the same material, the adhesiveness between the films can be easily improved. The film forming the first film member 415b and the film forming the second film member 425 may be formed of different materials.

Also with the flow path structure 400c described above, the foreign matter adhering to the first resin member 411 is prevented from being exposed in the first flow path 401c, and the foreign matter is prevented from being mixed into the liquid flowing in the first flow path 401c. In particular, in the present embodiment, since the first flow path 401c is also defined by the third surface 426 of the second film member 425, the foreign matter is further prevented from being mixed into the first flow path 401c. In addition, since the films of the first flow path member 410b and the second flow path member 420c are adhered to each other, the adhesive strength between the first flow path member 410b and the second flow path member 420c is improved.

In addition, in the present embodiment, as viewed from the first flow path 401c, there is a space outside the flow path structure 400c at a position pinching the second film member 425. Therefore, when a pressure fluctuation of the liquid flowing in the first flow path 401 occurs, the second film member 425 bends toward the outside of the flow path structure 400c, so that the pressure fluctuation generated in the first flow path 401c can be absorbed.

D. Fourth Embodiment

Figure 10:
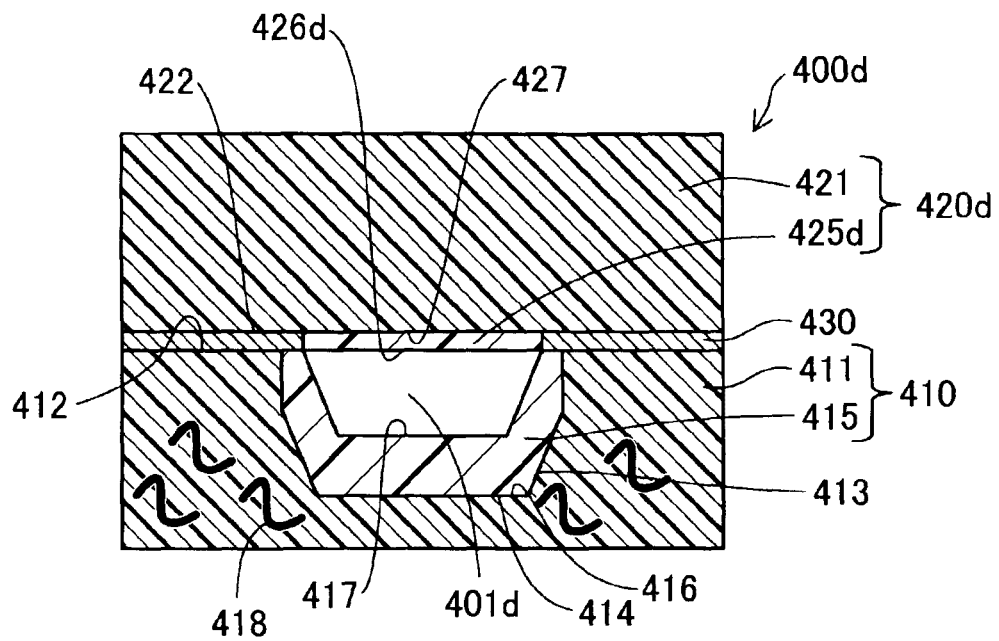
FIG. 10 is an explanatory diagram illustrating a schematic configuration of a flow path structure according to a fourth embodiment.

FIG. 10 is an explanatory diagram illustrating a schematic configuration of a flow path structure 400d according to the fourth embodiment. Similar to FIG. 9, FIG. 10 illustrates a cross section of the flow path structure 400d on a plane intersecting the extending direction of a first flow path 401d. In the flow path structure 400d, the first flow path member 410 has the same configuration as in the first embodiment.

A second flow path member 420d according to the present embodiment has a second resin member 421 and a second film member 425d. Unlike the third embodiment, a third surface 426d of the second film member 425d is not adhered to the first flow path member 410. In addition, the second film member 425d has a fourth surface 427 opposite to the third surface 426d in addition to the third surface 426d. The second resin member 421 is made of the same resin material as the first resin member 411. In addition, a second resin member 421*d* has a second front surface 422, and at least a portion of the fourth surface 427 is fixed to the second front surface 422.

Also with the flow path structure 400*d* described, the foreign matter adhering to the first resin member 411 is prevented from being exposed in the first flow path 401*d*. In particular, in the present embodiment, the foreign matter adhering to the second resin member 421*d* forming the second flow path member 420*d* is prevented from being exposed in the first flow path 401*d*.

E. Fifth Embodiment

Figure 11:
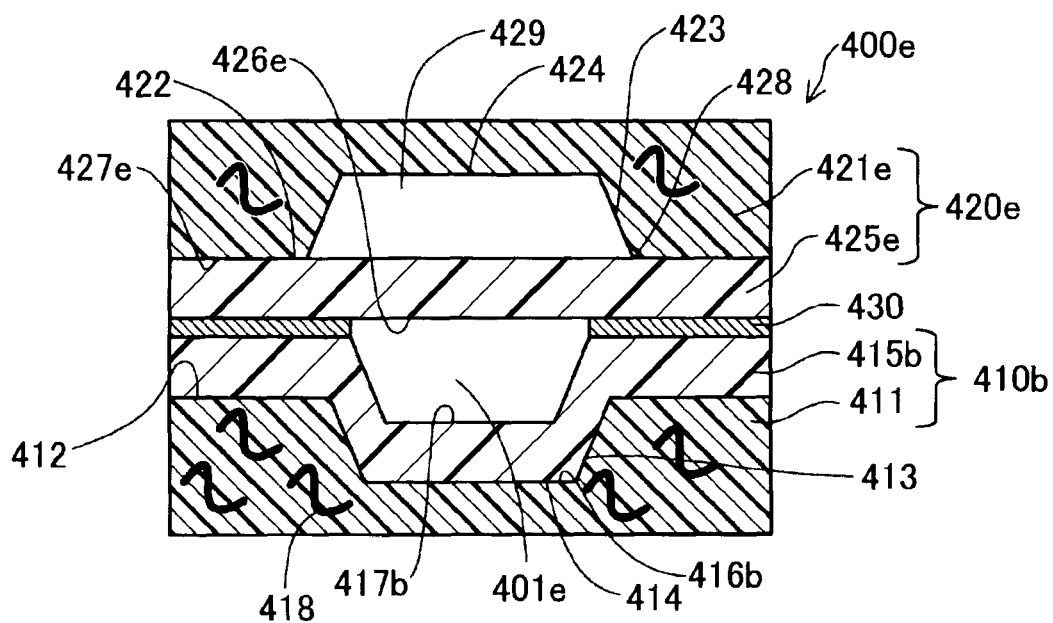
FIG. 11 is an explanatory diagram illustrating a schematic configuration of a flow path structure according to a fifth embodiment.

FIG. 11 is an explanatory diagram illustrating a schematic configuration of a flow path structure 400*e* according to a fifth embodiment. Similar to FIG. 8, FIG. 11 illustrates a cross section of the flow path structure 400*e* on a plane intersecting the extending direction of a first flow path 401*e*. In the flow path structure 400*e*, the first flow path member 410*b* has the same configuration as in the second embodiment.

Similar to the fourth embodiment, a second flow path member 420*e* according to the present embodiment has a second resin member 421*e* and a second film member 425*e*, and each of the configurations is different from that of the fourth embodiment. A second recessed portion 423 that faces the first recessed portion 413 of the first resin member 411 is provided on the second front surface 422 of the second resin member 421*e*. The second recessed portion 423 is a portion where the second front surface 422 is recessed in a direction away from the first flow path member 410 in the laminating direction. When the second front surface 422 is referred to in this specification, the second front surface 422 does not include the front surface of the second recessed portion 423. In addition, the front surface of the second recessed portion 423 may also be referred to as a second recessed portion front surface 424.

Similar to the third embodiment, a third surface 426*e* of the second film member 425*e* is adhered to the second surface 417*b* of the first film member 415*b* in a region overlapping the first front surface 412 in the laminating direction. In addition, a fourth surface 427*e* of the second film member 425*e* is adhered to the second front surface 422. On the other hand, the fourth surface 427*e* and the second recessed portion front surface 424 are separated from each other without being fixed to each other. Therefore, the second flow path member 420*e* has a first space 429 defined by the second recessed portion 423 and the second film member 425*e*. That is, the first space 429 is formed at a position pinching the second film member 425*e* as viewed from the first flow path 401*e*. The first space 429 may communicate with the outside of the flow path structure 400*e* by, for example, a communication passage (not illustrated) provided in the second resin member 421*e*. In the present embodiment, the first space 429 communicates with the atmosphere outside the flow path structure 400*e*.

As illustrated in FIG. 11, in the present embodiment, the width of the second recessed portion 423 is wider than the width of the first flow path 401*e*. In this case, when stress is generated in the second film member 425*e*, since the deformation of the second film member 425*e* that bends in the direction of the second recessed portion front surface 424 is unlikely to be hindered by the second resin member 421*e*, the durability of the second film member 425*e* is improved. Specifically, when the second film member 425*e* is deformed toward the second recessed portion front surface 424, it is possible to prevent an edge 428 of a boundary portion between the second recessed portion front surface 424 and the second front surface 422 from damaging the fourth surface 427*e* of the second film member 425*a*. On the other hand, when the width of the second recessed portion 423 is narrower than the width of the first flow path 401*e*, since a contact surface between the second film member 425*e* and the second resin member 421*e* increases, the second film member 425*e* is strongly fixed to the second resin member 421*e*. The width of the second recessed portion 423 may be the same as the width of the first flow path 401*e*.

Also with the flow path structure 400*d* described, the foreign matter adhering to the first resin member 411 is prevented from being exposed in the first flow path 401*d*. In particular, in the present embodiment, the first space 429 is formed at a position pinching the second film member 425*e* as viewed from the first flow path 401*c*. Therefore, when the pressure fluctuation of the liquid flowing in the first flow path 401*c* occurs, the second film member 425*e* bends toward the first space 429, so that the pressure fluctuation generated in the first flow path 401*e* can be absorbed.

F. Sixth Embodiment

Figure 12:
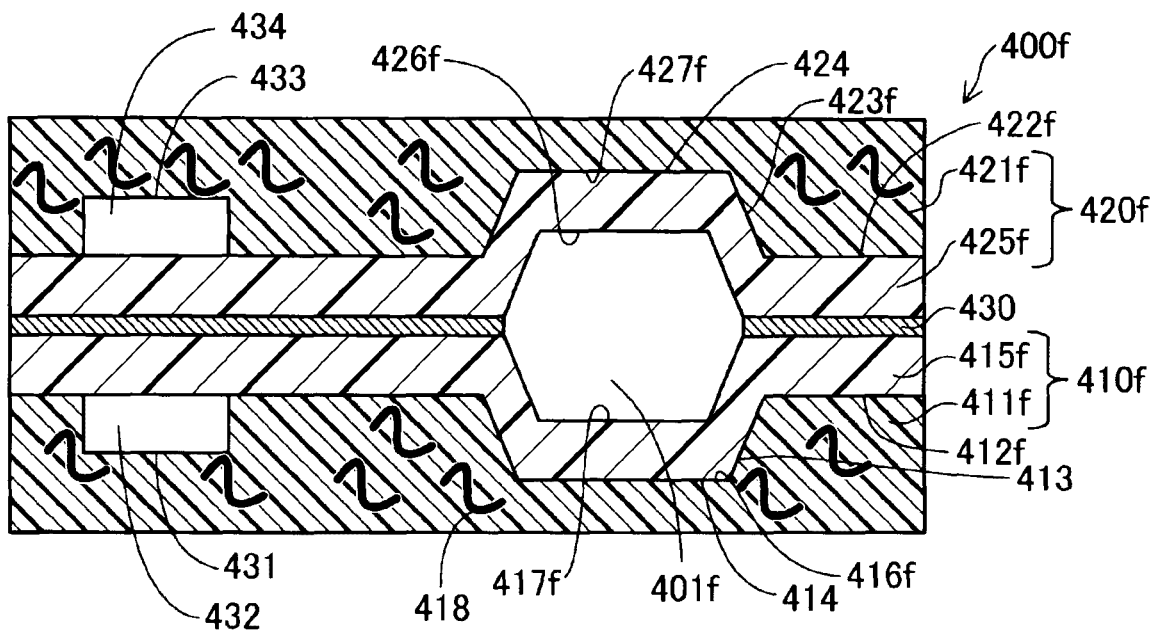
FIG. 12 is an explanatory diagram illustrating a schematic configuration of a flow path structure according to a sixth embodiment.

FIG. 12 is an explanatory diagram illustrating a schematic configuration of a flow path structure 400*f* according to a sixth embodiment. Similar to FIG. 6, FIG. 12 illustrates a cross section of the flow path structure 400*f* on a plane intersecting the extending direction of a first flow path 401*f*.

In the present embodiment, a first resin member 411*f* is provided with a third recessed portion 431 in addition to the first recessed portion 413. Similar to the first recessed portion 413, the third recessed portion 431 is a portion where a first front surface 412*f* of the first resin member 411 is recessed in a direction away from a second flow path member 420*f*. In the present embodiment, a first surface 416*f* of a first film member 415*f* is fixed in close contact with the first front surface 412 and the first recessed portion front surface 414. On the other hand, the first surface 416*f* is not fixed to the third recessed portion 431. Therefore, the first resin member 411*f* has a second space 432 defined by the first surface 416*f* and the third recessed portion 431. The second space 432 extends in a direction along the extending direction of the first flow path 401*f*.

A second resin member 421*f* is provided with a fourth recessed portion 433 in addition to a second recessed portion 423*f*. Similar to the second recessed portion 423*f*, the fourth recessed portion 433 is a portion where a second front surface 422*f* of the second resin member 421*f* is recessed in a direction away from a first flow path member 410*f*. In the present embodiment, a fourth surface 427*f* of a second film member 425*f* is fixed to the second front surface 422 and the second recessed portion front surface 424. On the other hand, the fourth surface 427*f* is not fixed to the fourth recessed portion 433. Therefore, the second resin member 421*f* has a third space 434 defined by a third surface 426*f* and the fourth recessed portion 433. The third space 434 extends in the direction along the extending direction of the first flow path 401*f*. That is, at least a portion of the fourth surface 427*f* is fixed to the second recessed portion front surface 424. Therefore, the first flow path 401*f* is defined by a second surface 417*f* of the first film member 415*f* that covers the first recessed portion 413 and the third surface 426*f* of the second film member 425*f* that covers the second recessed portion 423.

Also with the flow path structure 400*f* described above, the foreign matter adhering to the first resin member 411 is prevented from being exposed in the first flow path 401f. In particular, in the present embodiment, the first flow path 401f is defined by the third surface 426f of the second film member 425f that covers the second recessed portion 423. Therefore, the flow path area of the first flow path 401f is increased as compared with the case where the second recessed portion 423 is not provided, and it is possible to prevent the foreign matter adhered to the resin material forming the flow path structure 400f from mixing into the liquid flowing in the first flow path 401f.

In addition, in the present embodiment, the second space 432 and the third space 434 can reduce the stress generated in both members when the first film member 415f or the second film member 425f are adhered, for example. The second space 432 and the third space 434 may not be provided.

G. Seventh Embodiment

Figure 13:
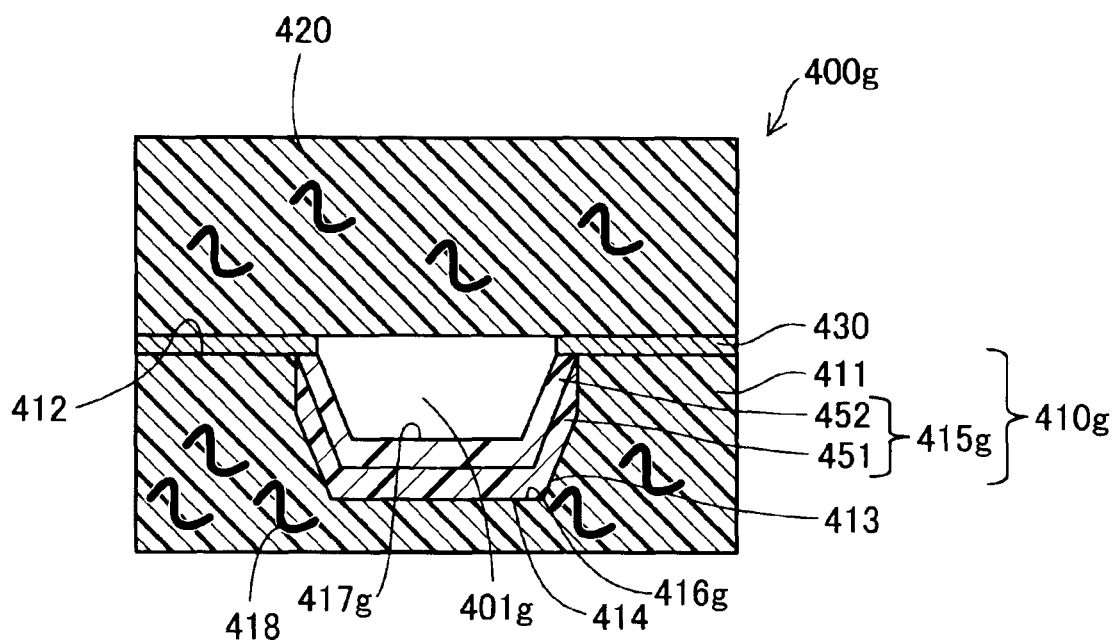
FIG. 13 is an explanatory diagram illustrating a schematic configuration of a flow path structure according to a seventh embodiment.

FIG. 13 is an explanatory diagram illustrating a schematic configuration of a flow path structure 400g according to a seventh embodiment. Similar to FIG. 6, FIG. 13 illustrates a cross section of the flow path structure 400g on a plane intersecting the extending direction of a first flow path 401g. A first film member 415g constituting a first flow path member 410g of the flow path structure 400g according to the present embodiment is different from that of the first embodiment.

In the present embodiment, the first film member 415g includes a first layer 451 and a second layer 452. Similar to the first film member 415 according to the first embodiment, the second layer 452 is a layer formed of polyethylene terephthalate resin containing a polyglycolic acid resin and forms a second surface 417g of the first film member 415. The first layer 451 is a layer formed of polyvinylidene chloride resin and constitutes a first surface 416g of the first film member 415. The first layer 451 is a layer having a higher gas barrier property than that of the second layer 452. The first layer 451 may be referred to as a gas barrier layer. The liquid flowing in the first flow path 401g can be in contact with the second layer 452 of the first film member 415, and cannot be in contact with the first layer 451.

The gas barrier layer is preferably formed of a material having at least one of polyvinylidene chloride, diamond-like carbon, alumina, and silicon oxide, which normally has a low gas permeability.

Also with the flow path structure 400g described above, the foreign matter adhering to the first resin member 411 is prevented from being exposed in the first flow path 401g. In particular, in the present embodiment, the first film member 415g has a gas barrier layer containing at least one of polyvinylidene chloride, diamond-like carbon, alumina, and silicon oxide. Therefore, evaporation and volatilization of the solvent, the volatile components, and the like contained in the liquid flowing in the first flow path 401 can be more effectively suppressed.

In addition, in the present embodiment, the first layer 451 which is a gas barrier layer constitutes the first surface 416g of the first film member 415g. As a result, the liquid flowing in the first flow path 401g cannot be in contact with the gas barrier layer, and thus it is possible to prevent the gas barrier layer from deteriorating due to the components contained in the liquid.

H. Eighth Embodiment

Figure 14:
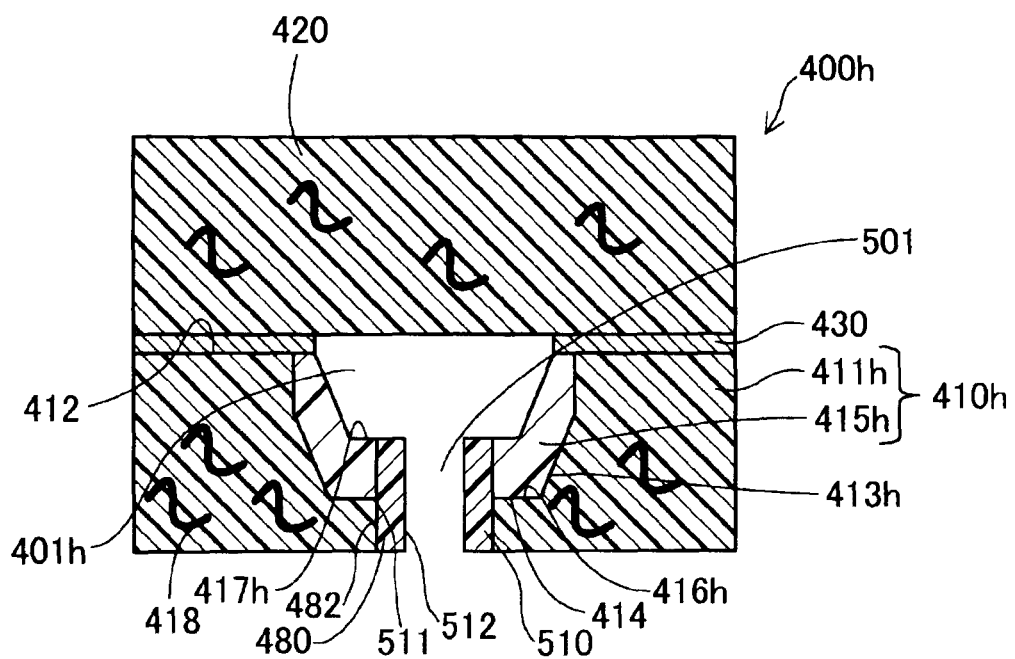
FIG. 14 is an explanatory diagram illustrating a schematic configuration of a flow path structure according to an eighth embodiment.

FIG. 14 is an explanatory diagram illustrating a schematic configuration of a flow path structure 400h according to an eighth embodiment. Similar to FIG. 6, FIG. 14 illustrates a cross section of the flow path structure 400h on a plane intersecting the extending direction of a first flow path 401h. The flow path structure 400h according to the present embodiment is provided with a second flow path 501 in addition to the first flow path 401h. For example, the flow path structure 400h can constitute the first supply flow path 219 illustrated in FIG. 5. When the first supply flow path 219 is configured to include the flow path structure 400h, the first flow path 401h corresponds to the horizontal flow path 217, and the second flow path 501 corresponds to the vertical flow path 218. The flow path structure 400h is not limited to the first supply flow path 219, and can constitute other flow paths.

A first flow path member 410h includes a cylindrical first pipe 510. Specifically, the first flow path member 410h is provided with a first through-hole 480 communicating with the first flow path 401h and extending along an intersecting direction intersecting a plane perpendicular to the laminating direction. In the present embodiment, the first through-hole 480 is provided along the laminating direction. That is, a first surface 416h, a second surface 417h, and a first recessed portion 413h of a first film member 415h according to the present embodiment have holes formed by the first through-holes 480. The first pipe 510 is disposed inside the first through-hole 480 with a first pipe outer peripheral surface 511, which is an outer peripheral surface thereof, being in close contact with a first through-hole inner peripheral surface 482, which is an inner peripheral surface of the first through-hole 480. As a result, a first pipe inner peripheral surface 512, which is the inner peripheral surface of the first pipe 510, defines the second flow path 501. The second flow path 501 is a flow path that communicates with the first flow path 401h and extends along the intersecting direction.

In the present embodiment, the first pipe 510 is made of polyethylene terephthalate resin. When the first pipe 510 is made of a material other than polyethylene terephthalate resin, the first pipe 510 is made of any one of polyethylene naphthalate resin, high-density polyethylene resin, vinyl chloride resin, and metal, which normally have high solvent resistance. When using a metal, it is preferable to use SUS, and, for example, iron or aluminum may be used.

The first pipe 510 is a member formed of the above resin in a cylindrical shape. For example, the first pipe 510 is formed by providing a cylindrical resin material with a cylindrical through-hole that penetrates from one bottom surface of the resin material to the other bottom surface. The thickness of the first pipe 510 is 300 or more. The thickness of the first pipe 510 refers to the thickness of the resin material forming the first pipe 510. The thickness of the first pipe 510 is also the difference between the radius of the first pipe outer peripheral surface 511 and the radius of the first pipe inner peripheral surface 512.

Figure 15:
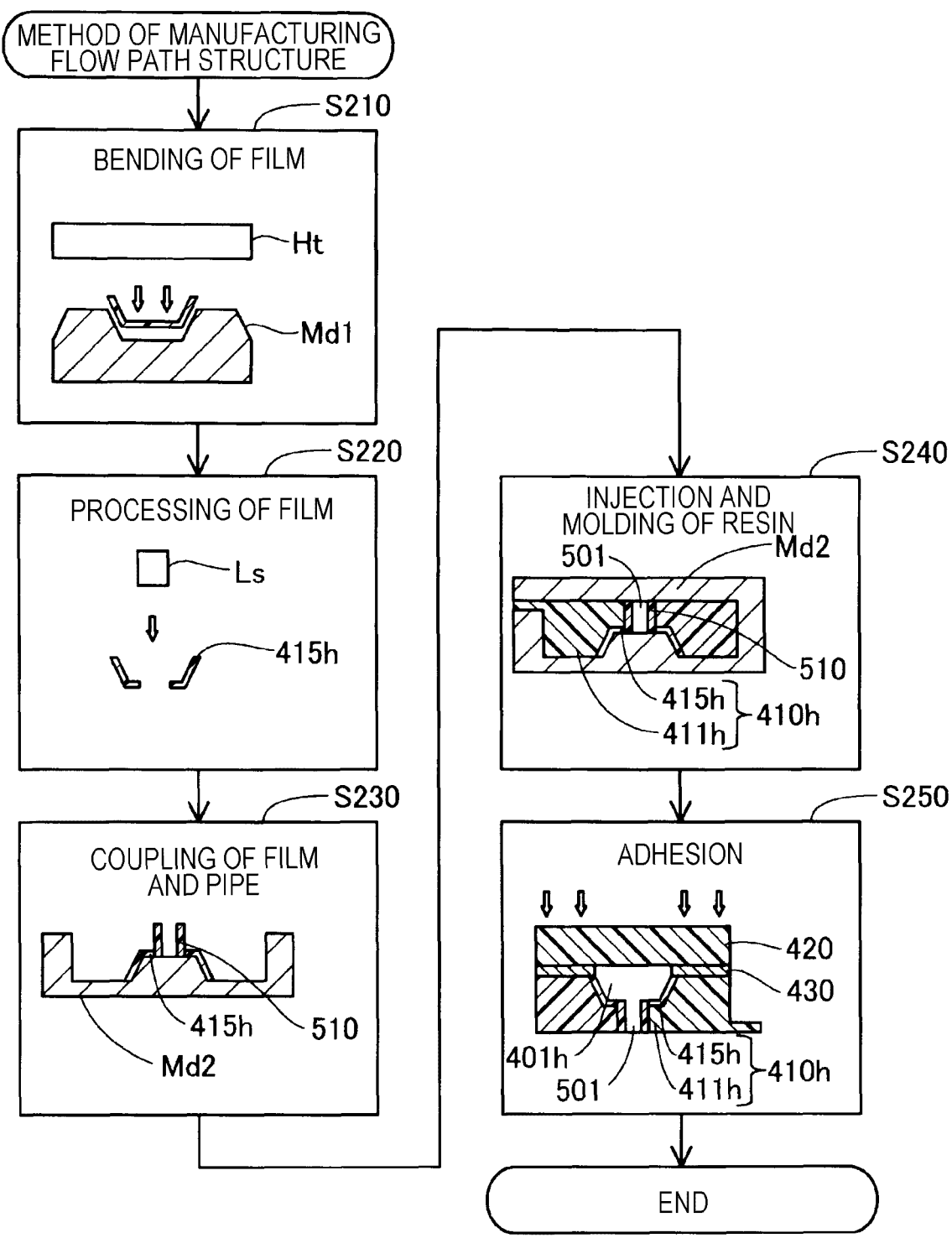
FIG. 15 is a process drawing illustrating a method of manufacturing the flow path structure according to the eighth embodiment.

FIG. 15 is a process drawing illustrating a method of manufacturing the flow path structure 400h according to the present embodiment.

In Step S210, the film is bent while being heated. Step S210 is the same step as Step S110 illustrated in FIG. 7.

In Step S220, the film is processed. Specifically, by irradiating the film with the laser from the laser oscillator Ls, holes are formed in the film, and the first film member 415h is created. The hole formed in the first film member 415h constitutes a portion of the first through-hole 480.

In Step S230, the first film member 415h and the first pipe 510 are coupled to each other and fixed to the molding die Md2. Specifically, the first pipe 510 is mounted on the molding die Md2 so that the first pipe 510 is in contact with the first film member 415h in the hole formed in the first film member 415h. The first film member 415h and the first pipe 510 may be coupled to each other in advance, and thereafter the first film member 415h and the first pipe 510 may be mounted on the molding die Md2.

In Step S240, resin is injected into the molding die Md2 for molding. By Step S240, the first flow path member 410h is formed. At this time, the second flow path 501 is formed in the first flow path member 410h.

In Step S250, the first flow path member 410h and the second flow path member 420 are adhered to each other with the adhesive layer 430. By Step S250, the first flow path 401h is formed, and the second flow path 501 and the first flow path 401h formed in the first flow path member 410h communicate with each other. The flow path structure 400h is completed by the above steps S210 to S250.

Figure 16:
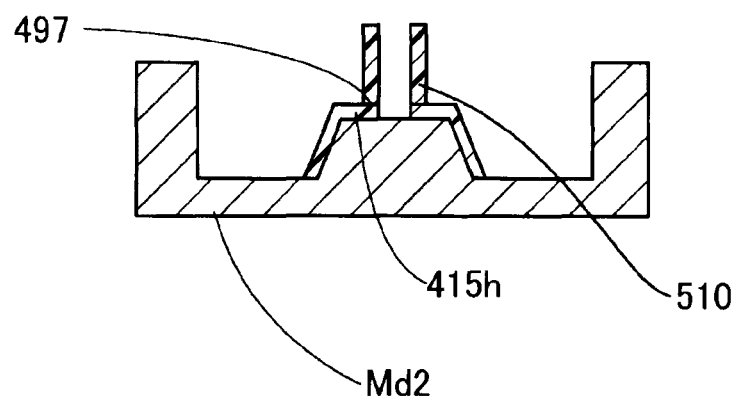
FIG. 16 is an explanatory diagram illustrating a state where a first pipe is mounted on a first film member.

FIG. 16 is an explanatory diagram illustrating a state where the first pipe 510 is mounted on the first film member 415h. In Step S230, as illustrated in FIG. 16, the first film member 415h and the first pipe 510 may be coupled to each other by mounting the first pipe 510 on the first film member 415h. In this case, a contact portion 497, which is a portion on which the first pipe 510 is mounted, of the first film member 415h is preferably planar. By making the contact portion 497 planar, the adhesion between the first pipe 510 and the first film member 415h can be improved with a simple configuration. Even when the contact portion 497 has a curved shape, for example, by processing one end of the first pipe 510 in accordance with the shape of the contact portion 497, the adhesion between the first pipe 510 and the first film member 415h can be improved.

Also with the flow path structure 400h described above, the foreign matter adhering to a first resin member 411h is prevented from being exposed in the first flow path 401h. In particular, in the present embodiment, the first pipe 510 defines the second flow path 501 communicating with the first flow path 401h. Therefore, a flow direction of the ink flowing in the flow path structure 400h can be changed in two ways, that is, the extending direction of the first flow path 401 and the extending direction of the second flow path 501. In addition, mixing of the foreign matter into the liquid in the second flow path 501 is suppressed, and deterioration of the second flow path 501 due to the liquid is suppressed.

I. Ninth Embodiment

Figure 17:
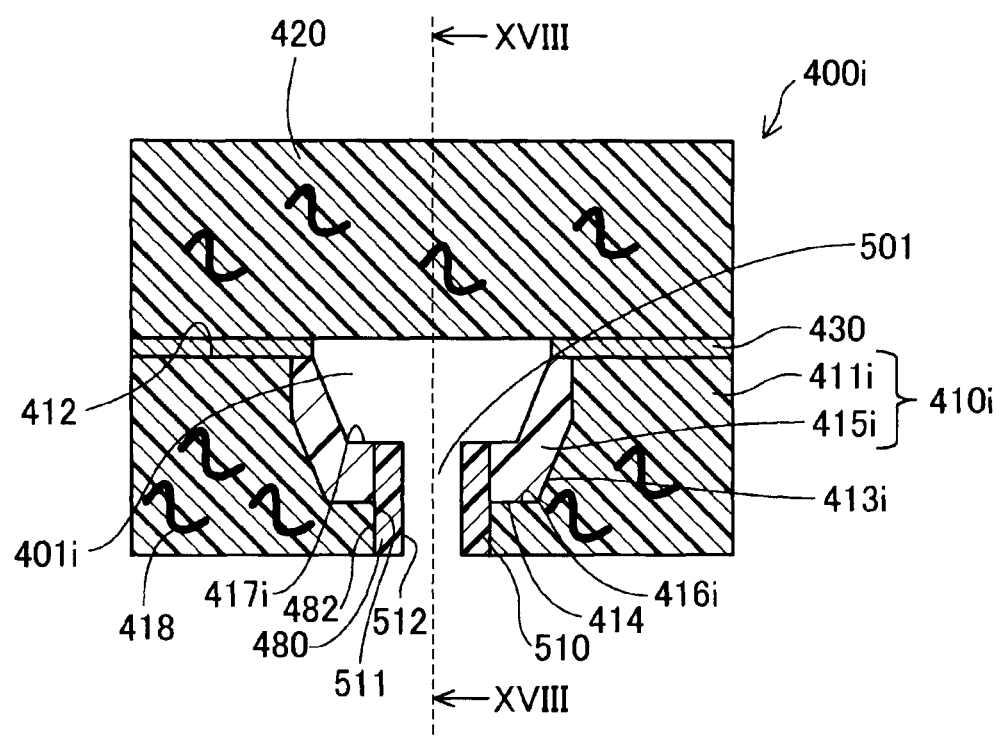
FIG. 17 is an explanatory diagram illustrating a schematic configuration of a flow path structure according to a ninth embodiment.
Figure 18:
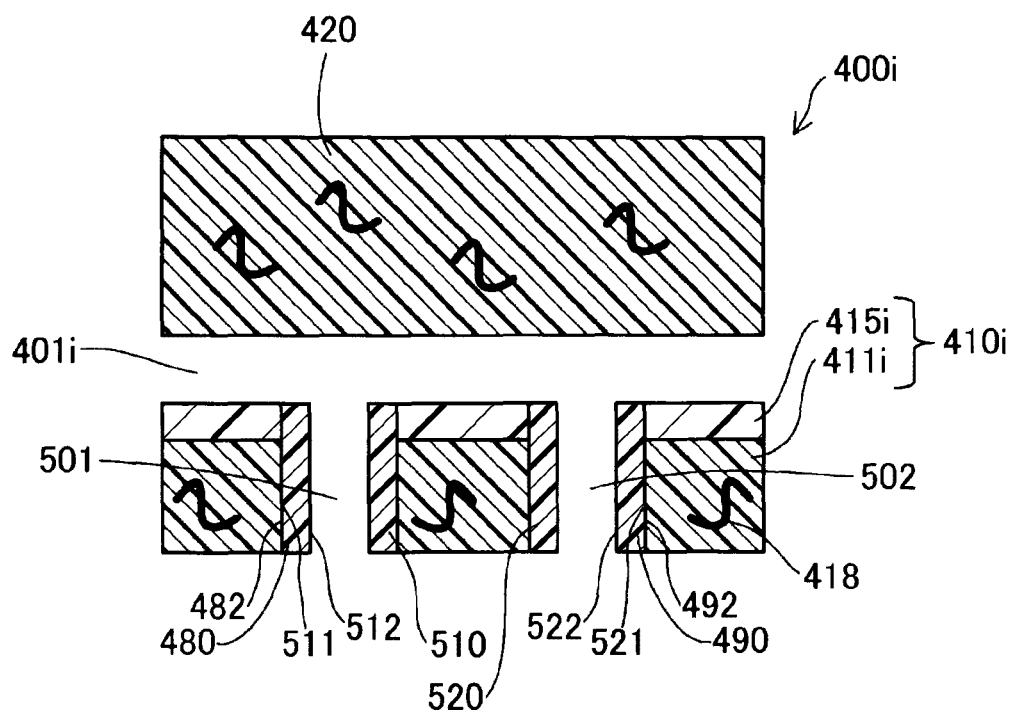
FIG. 18 is a cross-sectional view taken along the line XVIII-XVIII of the flow path structure in FIG. 17.

FIG. 17 is an explanatory diagram illustrating a schematic configuration of a flow path structure 400i according to a ninth embodiment. FIG. 18 is a cross-sectional view taken along the line XVIII-XVIII of the flow path structure 400i in FIG. 17. Similar to FIG. 14, FIG. 17 illustrates a cross section of the flow path structure 400i on a plane intersecting the extending direction of a first flow path 401i. FIG. 18 illustrates a cross-sectional view of a portion of the flow path structure 400i in FIG. 14 indicated by the one-dot chain line and the arrow.

As illustrated in FIG. 18, a first flow path member 410i according to the present embodiment includes a second pipe 520 in addition to the first pipe 510. Specifically, the first flow path member 410i formed by a first resin member 411i and a first film member 415i is provided with a second through-hole 490 communicating with the first flow path 401i and extending along an intersecting direction intersecting a plane perpendicular to the laminating direction. In the present embodiment, the second through-hole 490 is provided along the laminating direction. The second pipe 520 is disposed inside the second through-hole 490 with a second pipe outer peripheral surface 521, which is an outer peripheral surface thereof, being in close contact with a second through-hole inner peripheral surface 492, which is an inner peripheral surface of the second through-hole 490. As a result, a second pipe inner peripheral surface 522, which is the inner peripheral surface of the second pipe 520, defines a third flow path 502. The third flow path 502 is a flow path that communicates with the first flow path 401i and extends along the intersecting direction. The configuration of the first pipe 510 is similar to that of the eighth embodiment. In addition, the material forming the second pipe 520 is the same as that of the first pipe 510, and thus the description thereof is omitted. The first pipe 510 and the second pipe 520 may be made of different materials.

Also with the flow path structure 400h described above, the foreign matter adhering to a first resin member 411h is prevented from being exposed in the first flow path 401h. In particular, in the present embodiment, even when the flow path structure 400i is provided with a plurality of flow paths defined by pipes and extending in the laminating direction, mixing of the foreign matter into the liquid is suppressed, and deterioration of each flow path due to the liquid is suppressed.

J. Other Embodiments

J-1. In the above embodiment, the flow path structure 400 includes one first flow path 401. On the other hand, the flow path structure 400 may include a plurality of first flow paths 401. The flow path structure 400 may be provided with the first flow path 401 depending on the type of liquid used, for example. In this case, one first flow path 401 may be provided for one type of liquid, or the plurality of first flow paths 401 may be provided for a plurality of types of liquids. When the flow path structure 400 includes the plurality of first flow paths 401 corresponding to the plurality of types of liquids, the plurality of first flow paths 401 are independent flow paths and do not communicate with each other.

J-2. In the above embodiment, when the flow path structure 400 is disposed, the first flow path member 410 may be disposed vertically below the second flow path member 420, or the second flow path member 420 may be disposed vertically below the first flow path member 410.

Figure 19:
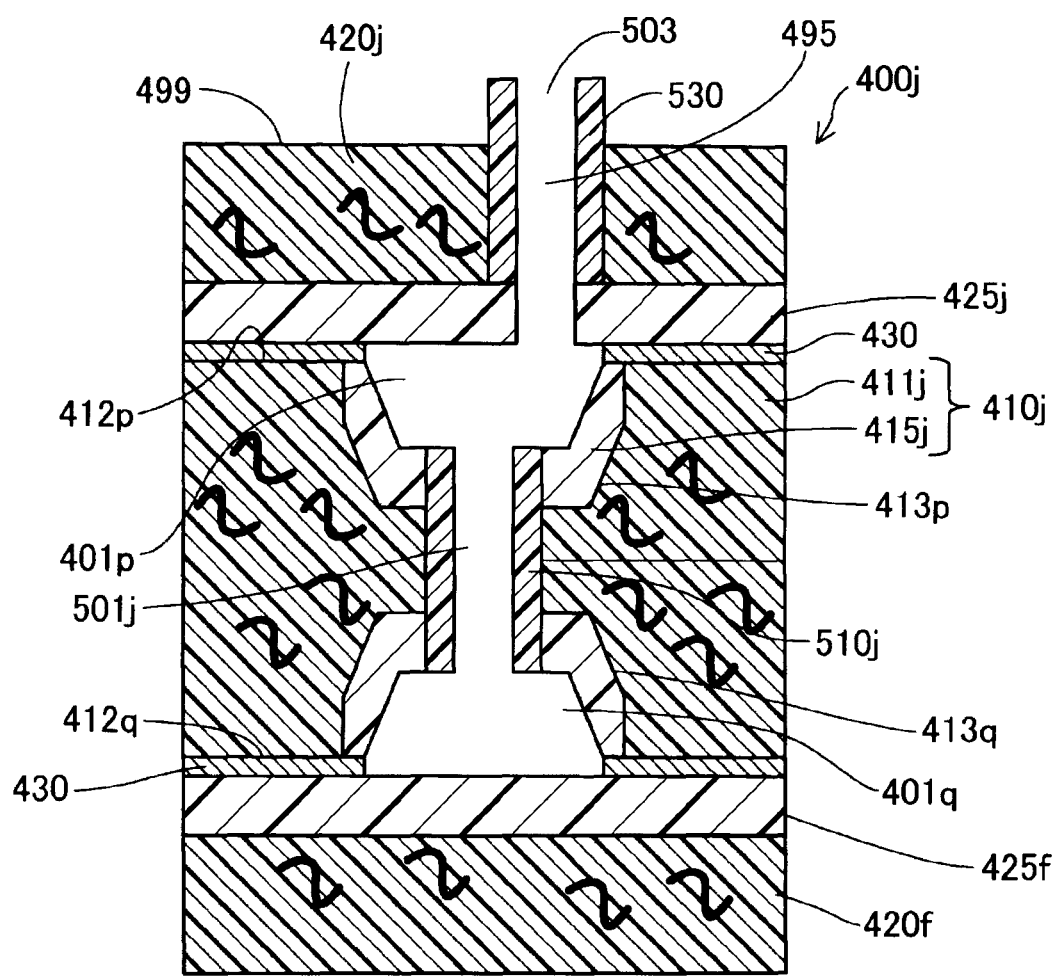
FIG. 19 is an explanatory diagram illustrating a schematic configuration of a flow path structure which is a modified example of the eighth embodiment.

J-3. FIG. 19 is an explanatory diagram illustrating a schematic configuration of a flow path structure 400j which is a modified example of the eighth embodiment. Similar to FIG. 14, FIG. 19 illustrates a cross section of the flow path structure 400j on a plane intersecting the extending direction of a first flow path 401p. In the present embodiment, the first resin member 411j of a first flow path member 410j includes two recessed portions, a first recessed portion 413p provided in a first front surface 412p of the first resin member 411j, and a first recessed portion 413q provided on the first front surface 412p of the first resin member 411j opposite to a first front surface 412q. In addition, a second flow path member 420j facing the first front surface 412p of the first flow path member 410j and the second flow path member 420f facing the first front surface 412q of the first flow path member 410j are adhered to the first flow path member 410j via the adhesive layers 430, respectively. The second flow path member 420j according to the present embodiment includes a second film member 425j, and the second flow path member 420f includes the second film member 425f. That is, the flow path structure 400j includes the first flow path 401p defined by a first film member 415j and the second film member 425j, and a first flow path 401q defined by the first film member 415j and the second film member 425f. In addition, a second flow path 501*j* is defined by a first pipe 510*j* between the first recessed portion 413*p* and the first recessed portion 413*q*. The first recessed portion 413*p* and the first recessed portion 413*q* communicate with each other via the second flow path 501*j*. In addition, the second flow path member 420*j* is provided with a third through-hole 495 which communicates with the first flow path 401*p* and extends along the laminating direction. A third pipe 530 extending in the laminating direction is disposed inside the third through-hole 495. The third pipe 530 projects from an outer surface 499 of the second flow path member 420*j* in the laminating direction. The inner peripheral surface of the third pipe 530 defines a fourth flow path 503 communicating with the first flow path 401*j*. According to the flow path structure 400*j* having such a configuration, it is possible to flow the liquid flowing in the flow path of the flow path structure 400*j* while changing the flow direction. In addition, for example, by forming the third pipe 530 with SUS and coupling a flow path such as a flexible tube to the third pipe 530, the liquid introduced from the tube can be flowed by the flow path structure 400*j*. The third pipe 530 may not project from the outer surface 499. In addition, for example, the second flow path member 420*f* or the second flow path member 420*j* may be provided with a pipe that defines a flow path communicating with the first flow path, in addition to the third pipe 530. Furthermore, the third through-hole 495, the third pipe 530, or the fourth flow path 503 may not be provided.

Figure 20:
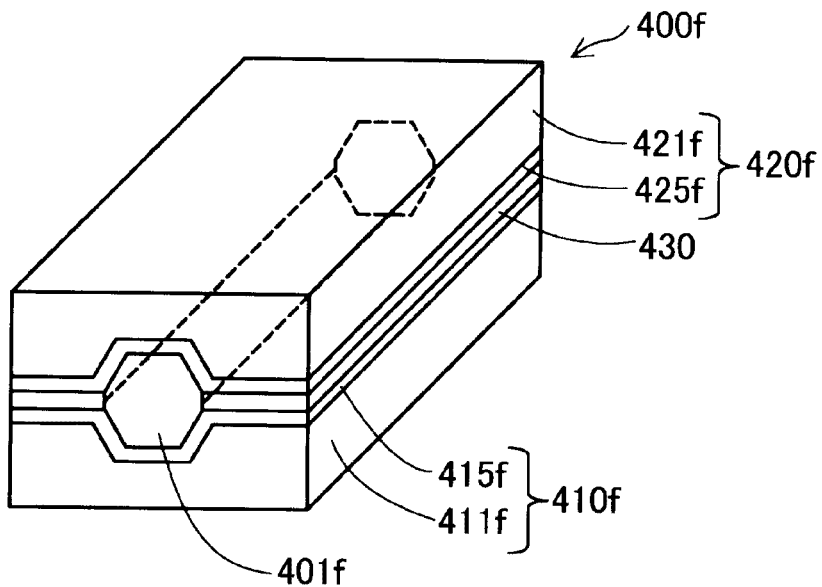
FIG. 20 is a perspective view illustrating a linear first flow path formed in the flow path structure according to the sixth embodiment.
Figure 21:
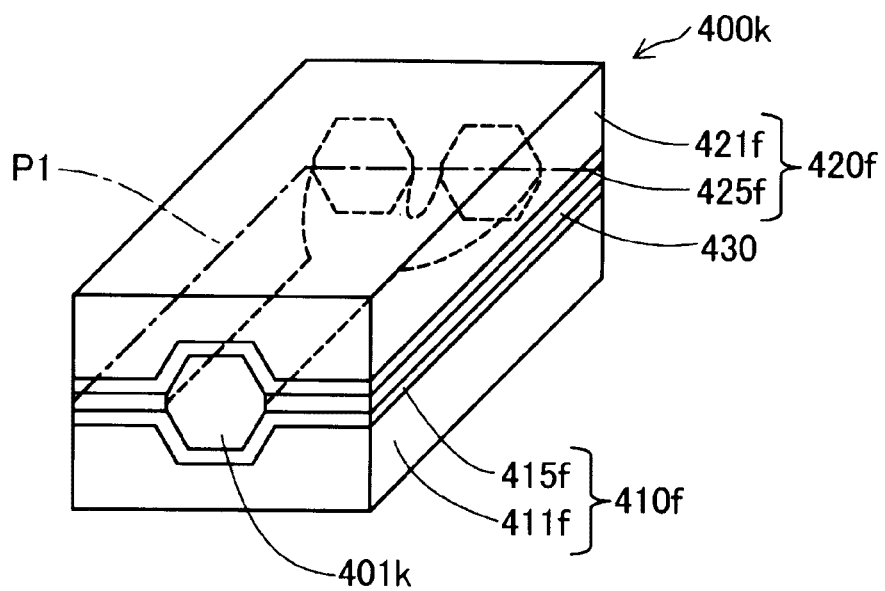
FIG. 21 is a perspective view illustrating a branched first flow path formed in the flow path structure.

J-4. In the above embodiment, the first flow path 401 is not a linear flow path and may be, for example, a flow path having a curved portion or a branched flow path. FIG. 20 is a perspective view illustrating a linear first flow path 401*f* formed in the flow path structure 400*f* according to the sixth embodiment. FIG. 21 is a perspective view illustrating a branched first flow path 401*k* formed in a flow path structure 400*k*. In FIG. 20, the first flow path 401*f* penetrating the flow path structure 400*f* along the extending direction of the first flow path 401*f* is indicated by a broken line. Similar to the flow path structure 400*f*, the flow path structure 400*k* illustrated in FIG. 21 is formed by the first flow path member 410*f* and a second flow path member 420*f* having a second film member 425*f*. In FIG. 21, a first flow path 401*k* that extends along a plane P1, has a curved portion, and branches is illustrated by a broken line. The flow path structure 400*f* and the flow path structure 400*k* are not provided with the second space 432 and the third space 434.

Figure 22:
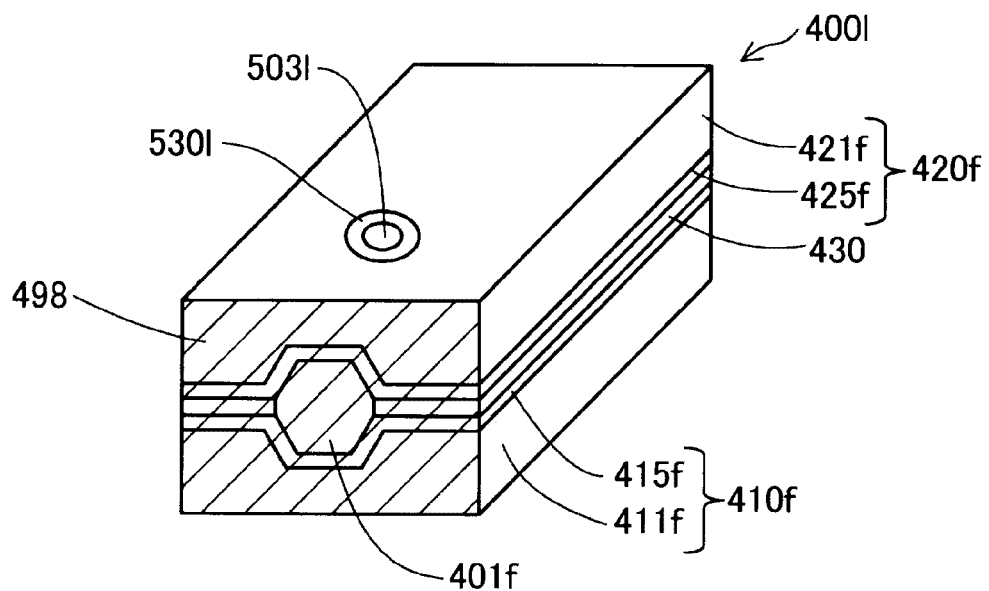
FIG. 22 is a perspective view illustrating a flow path structure having a first flow path and a fourth flow path.

J-5. FIG. 22 is a perspective view illustrating a flow path structure 400*l* having the first flow path 401*f* and a fourth flow path 503*l*. The flow path structure 400*l* has a configuration in which a third pipe 530*l* having a fourth flow path 503*l* communicating with the first flow path 401*f* is provided in the flow path structure 400*f* illustrated in FIG. 20. In addition, one end of the first flow path 401*f* in the extending direction is liquid-tightly sealed by a seal portion 498 made of the same film as that of the first film member 415*f* so as not to communicate with the outside. In FIG. 22, the seal portion 498 is provided in the hatched portion. With such a configuration, the flow of the liquid flowing in the flow path structure 400*l* can be controlled with a simple configuration. The third pipe 530*l* does not protrude from the flow path structure 400*l*. In addition, for example, the seal portion 498 may be made of a film and a resin material.

Figure 23:
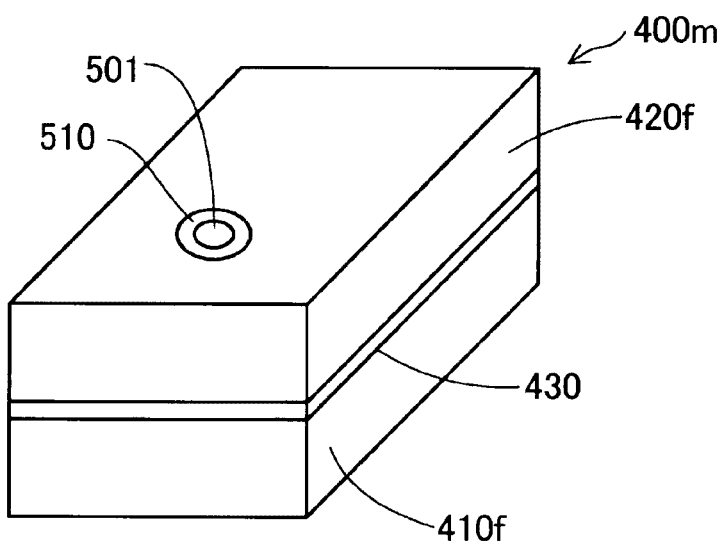
FIG. 23 is a perspective view illustrating a flow path structure having a first flow path, a second flow path, and a fourth flow path.
Figure 24:
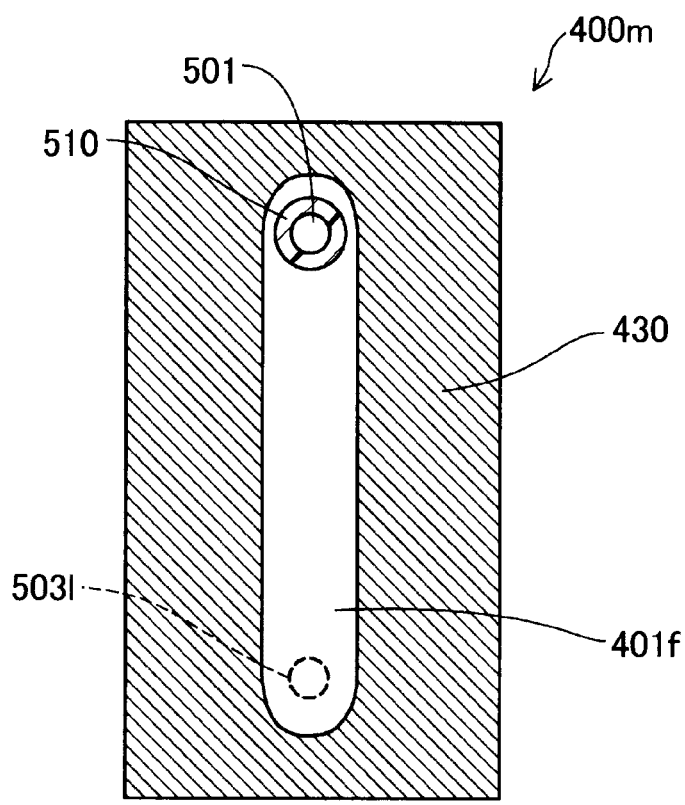
FIG. 24 is a cross-sectional view of the flow path structure illustrated in FIG. 23.

J-6. FIG. 23 is a perspective view illustrating a flow path structure 400*m* having a first flow path 401*f*, the second flow path 501, and a fourth flow path 503*l*. FIG. 24 is a cross-sectional view of the flow path structure 400*m* illustrated in FIG. 23. Specifically, FIG. 24 is a cross-sectional view of the flow path structure 400*m* taken along the adhesive layer 430 and viewed from the first flow path member 410*f* side. As illustrated in FIGS. 23 and 24, the flow path structure 400*m* includes a first flow path 401*f* that extends inside the flow path structure 400 without penetrating the flow path structure 400*m*. The second flow path 501 is not illustrated in FIG. 23. In addition, in FIG. 24, the position where the fourth flow path 503*l* communicates with the first flow path 401 in the extending direction of the first flow path 401 is indicated by a broken line. By the flow path structure 400*m*, for example, the liquid introduced from the fourth flow path 503*l* to the first flow path 401*f* is caused to flow in the horizontal direction along the first flow path 401*f*, and vertically downward along the second flow path 501.

Figure 25:
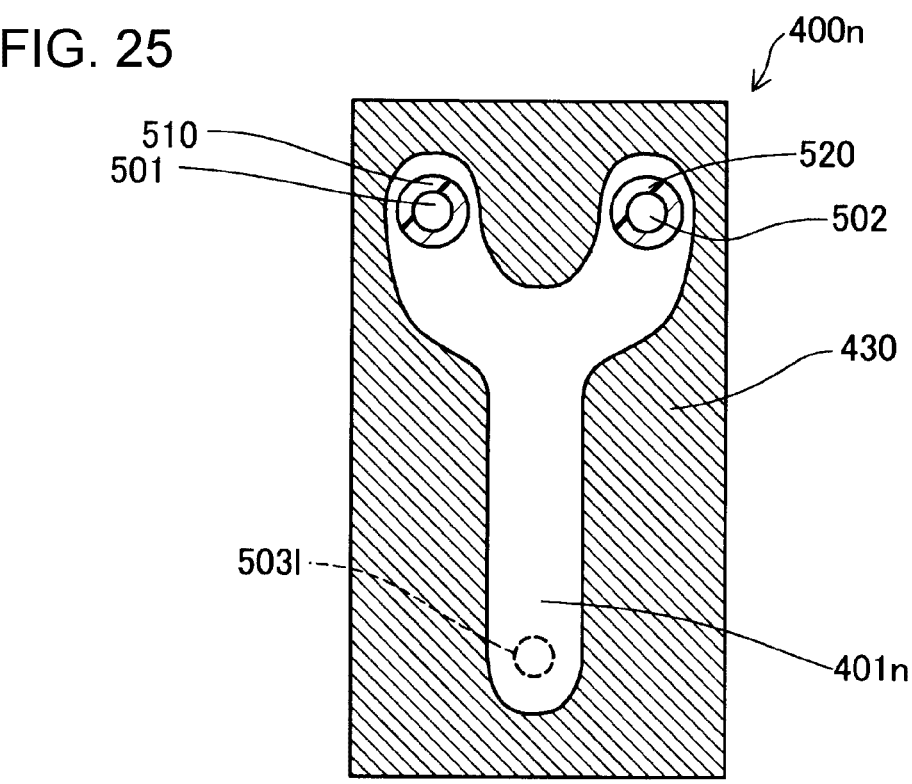
FIG. 25 is a cross-sectional view of a flow path structure which is a modified example of the ninth embodiment.

J-7. FIG. 25 is a cross-sectional view of a flow path structure 400*n* which is a modified example of the ninth embodiment. The flow path structure 400*n* includes a branched first flow path 401*n*, the second flow path 501 and the third flow path 502 provided so as to communicate with each of the branched front flow paths of the first flow path 401*n*, and a fourth flow path 503*l*. With such a configuration, for example, the liquid introduced from the fourth flow path 503*l* to the first flow path 401*n* can be branched in the horizontal direction along the first flow path 401*n* to flow, and can be flowed vertically downward by each of the second flow path 501 and the third flow path 502.

Figure 26:
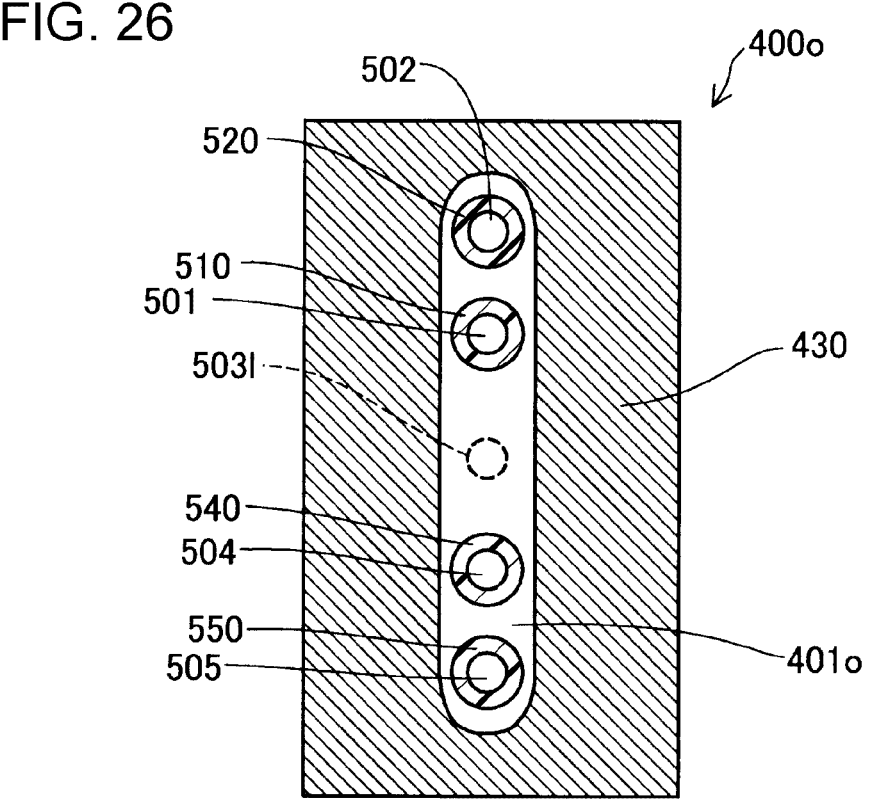
FIG. 26 is a cross-sectional view of a flow path structure which is a modified example of the ninth embodiment.
Figure 27:
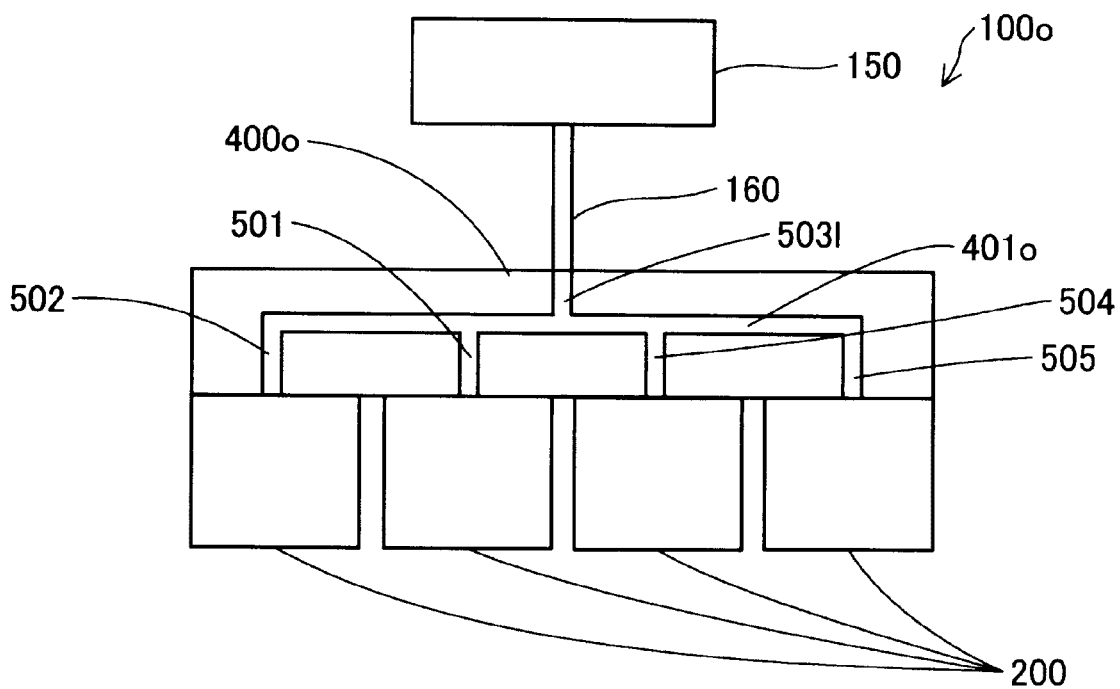
FIG. 27 is a schematic diagram illustrating a liquid ejecting apparatus including a plurality of liquid ejecting heads.

J-8. FIG. 26 is a cross-sectional view of a flow path structure 400*o* which is a modified example of the ninth embodiment. The flow path structure 400*o* includes a first flow path 401*o*, the second flow path 501, the third flow path 502, the fourth flow path 503*l*, a fifth flow path 504 defined by a fourth pipe 540, and a sixth flow path 505 defined by a fifth pipe 550. With such a configuration, for example, the liquid flowing in the first flow path 401*o* can be caused to flow vertically downward while being branched by a plurality of flow paths extending vertically downward. For example, FIG. 27 is a schematic diagram illustrating a liquid ejecting apparatus 100*o* including a plurality of liquid ejecting heads 200. The liquid ejecting apparatus 100*o* is provided with the plurality of liquid ejecting heads 200, a flow path structure 400*o* disposed upstream of the plurality of liquid ejecting heads 200, the tube 160 coupled to the fourth flow path 503*l* of the flow path structure 400*o*, and the ink tank 150. In the liquid ejecting apparatus 100*o*, the ink supplied from the ink tank 150 to the fourth flow path 503*l* via the tube 160 flows to the first flow path 401*o*. Thereafter, the ink in the first flow path 401*o* is supplied to each head 200 via the second flow path 501, the third flow path 502, the fifth flow path 504, and the sixth flow path 505. That is, with such a configuration, the liquid flowing in the first flow path 401*o* can be branched toward each of the liquid ejecting heads 200 by the plurality of flow paths extending vertically downward.

J-9. In the above embodiment, the filler 418 is added to the first resin member 411 or the second resin member 421. On the other hand, the filler 418 may not be added to the first resin member 411 or the second resin member 421.

J-10. In the above embodiment, the second flow path 501, the third flow path 502, the fourth flow path 503, and the fifth flow path 504 are flow paths along the laminating direction, and these flow paths may not be along the laminating direction. For example, these flow paths may be flow paths that intersect the laminating direction and are along the intersecting direction. Furthermore, in addition to these flow paths, other flow paths extending along the intersecting direction may be provided.

K. Other Aspects

The present disclosure is not limited to the above-described embodiments, and can be implemented in various forms without departing from the spirit thereof. For example, the present disclosure can be implemented as the following aspects. The technical features in each of the above-described embodiments corresponding to the technical features in each of the aspects described below can be appropriately replaced or combined in order to solve a portion of or all of the problems of the present disclosure or to achieve a portion of or all of the effects of the present disclosure.

In addition, when the technical features are not described as essential in this specification, the technical features can be deleted as appropriate.

1. According to a first aspect of the present disclosure, a flow path structure is provided. The flow path structure including a first flow path includes a first flow path member that includes a first resin member made of a resin and a first film member having a film, a second flow path member laminated on the first flow path member and adhered to the first flow path member, in which the first resin member includes a first front surface which is a surface facing the second flow path member and is provided with a first recessed portion, the first film member includes a first surface and a second surface opposite to the first surface, at least a portion of the first surface is in close contact with a front surface of the first resin member inside the first recessed portion, and the second surface of the first film member and the second flow path member define at least a portion of the first flow path in a region overlapping the first recessed portion in a laminating direction of the first flow path member and the second flow path member.

According to such an aspect, the foreign matter adhering to the first resin member is prevented from being exposed in the first flow path, and the foreign matter is prevented from mixing into the liquid flowing in the first flow path.

2. In the flow path structure according to the above aspect, at least a portion of the first surface may be in close contact with the first front surface of the first resin member. According to such an aspect, the adhesion between the first film member and the first resin member is improved.

3. In the flow path structure according to the above aspect, the second flow path member may include a second film member having a film, the second film member may include a third surface facing the first flow path member, and the second surface of the first film member and the third surface of the second film member may define the first flow path in the region overlapping the first recessed portion in the laminating direction. According to such an aspect, the foreign matter is further prevented from mixing into the first flow path.

4. In the flow path structure according to the above aspect, the second flow path member may include a second film member having a film, the second film member may include a third surface facing the first flow path member, the third surface may be adhered to the second surface in a region overlapping the first front surface in the laminating direction, and the second surface of the first film member and the third surface of the second film member may define the first flow path in the region overlapping the first recessed portion in the laminating direction. According to such an aspect, the foreign matter adhering to the second resin member forming the second flow path member may be prevented from being exposed in the first flow path. In addition, since the films of the first flow path member and the second flow path member are adhered to each other, the adhesive strength between the first flow path member and the second flow path member is improved.

5. In the flow path structure according to the above aspect, the second flow path member may include a second resin member made of a resin, the second film member may include a fourth surface opposite to the third surface of the second film member in the laminating direction, and the second resin member may include a second front surface fixed to at least a portion of the fourth surface. According to such an aspect, the foreign matter adhering to the second resin member forming the second flow path member may be prevented from being exposed in the first flow path.

6. In the flow path structure according to the above aspect, a second recessed portion facing the first recessed portion may be provided on the second front surface, and a front surface of the second resin member inside the second recessed portion and the fourth surface may be separated from each other. According to such an aspect, a space is formed at a position pinching the second film member as viewed from the first flow path. Therefore, when the pressure fluctuation of the liquid flowing in the first flow path occurs, the pressure fluctuation generated in the first flow path may be absorbed by the bending of the second film member.

7. In the flow path structure according to the above aspect, a second recessed portion facing the first recessed portion may be provided on the second front surface, and at least a portion of the fourth surface may be fixed to a front surface of the second resin member inside the second recessed portion. According to such an aspect, the flow path area of the first flow path is increased as compared with the case where the second recessed portion is not provided, and the foreign matter adhered to the resin material forming the flow path structure may be prevented from mixing into the liquid flowing in the first flow path member.

8. In the flow path structure according to the above aspect, the first flow path may communicate with a plurality of flow paths extending in a direction intersecting an extending direction of the first flow path, and the plurality of flow paths may be provided in the first resin member. According to such an aspect, even when the flow path in the flow path structure is branched into a plurality of flow paths, the foreign matter may be prevented from mixing into the liquid flowing in the flow path structure.

9. In the flow path structure of the above aspect, the first flow path member may be an integrally molded product of the first resin member and the first film member. According to such an aspect, the first flow path member may be configured without using a fixture or the like for bringing the first resin member and the first film member into close contact with each other.

10. In the flow path structure of the above aspect, the film may contain at least one of a polyethylene terephthalate resin, a polyethylene naphthalate resin, a high-density polyethylene resin, and a vinyl chloride resin. According to such an aspect, the solvent resistance of the first film member may be improved.

11. In the flow path structure according to the above aspect, the first film member may have a higher gas barrier property than that of the first resin member. According to such an aspect, it is possible to suppress evaporation and volatilization of the solvent, the volatile component, and the like contained in the liquid flowing in the first flow path.

12. In the flow path structure according to the above aspect, the film may contain a polyglycolic acid resin. According to such an aspect, it is possible to suppress evaporation and volatilization of the solvent, the volatile component, and the like contained in the liquid flowing in the first flow path.

13. In the flow path structure according to the above aspect, the first film member may include a gas barrier layer containing at least one of polyvinylidene chloride, diamond-like carbon, alumina, and silicon oxide. According to such an aspect, evaporation and volatilization of the solvent, the volatile component, and the like contained in the liquid flowing in the first flow path may be more effectively suppressed.

14. In the flow path structure according to the above aspect, the first surface of the first film member may be formed by the gas barrier layer. According to such an aspect, since the liquid flowing in the first flow path may not come into contact with the gas barrier layer, it is possible to prevent the gas barrier layer from being deteriorated by the component contained in the liquid.

15. In the flow path structure according to the above aspect, the first resin member may be a resin containing a filler. According to such an aspect, the filler contained in the first resin member is prevented from exposing to the first flow path as the foreign matter by the first film.

16. In the flow path structure according to the above aspect, the first flow path member may include a cylindrical first pipe made of any one of a polyethylene terephthalate resin, a polyethylene naphthalate resin, a high-density polyethylene resin, a vinyl chloride resin, and metal, the first flow path member may be provided with a first through-hole communicating with the first flow path and extending along an intersecting direction intersecting a plane perpendicular to the laminating direction, the first pipe may be disposed inside the first through-hole, with an outer peripheral surface of the first pipe being in close contact with an inner peripheral surface of the first through-hole, and an inner peripheral surface of the first pipe may define a second flow path communicating with the first flow path and extending along the intersecting direction. According to such an aspect, the flow direction of the ink flowing in the flow path structure may be changed in two ways, that is, the extending direction of the first flow path and the extending direction of the second flow path. In addition, mixing of the foreign matter into the liquid in the second flow path is suppressed, and deterioration of the second flow path due to the liquid is suppressed.

17. In the flow path structure of the above aspect, the first flow path member may include a cylindrical second pipe made of any one of a polyethylene terephthalate resin, a polyethylene naphthalate resin, a high-density polyethylene resin, a vinyl chloride resin, and metal, the first flow path member is provided with a second through-hole communicating with the first flow path and extending along the intersecting direction, the second pipe may be disposed inside the second through-hole such that an outer peripheral surface of the second pipe is in close contact with an inner peripheral surface of the second through-hole, and an inner peripheral surface of the second pipe may define a third flow path communicating with the first flow path and extending along the intersecting direction. According to such an aspect, even when the flow path structure is provided with a plurality of flow paths defined by pipes and extending in the laminating direction, mixing of the foreign matter into the liquid is suppressed and deterioration of each flow path due to the liquid is suppressed.

18. According to a second aspect of the present disclosure, a method of manufacturing a flow path structure is provided. A method of manufacturing a flow path structure including a flow path defined by a first flow path member having a film member having a film and a resin member made of a resin and having a recessed portion, and a second flow path member laminated on the first flow path member, the method includes a step of creating the film member by forming unevenness corresponding to the recessed portion in the film by bending the film while heating the film, a step of creating the first flow path member in which the film member and the resin member are integrally molded so that the unevenness and the recessed portion correspond to each other, by fixing the film member to a mold and injecting the resin into the mold to perform molding, and a step of adhering the first flow path member and the second flow path member to each other so that the film member and the second flow path member define at least a portion of the flow path in a region overlapping the first recessed portion in a laminating direction of the first flow path member and the second flow path member.

According to such an aspect, the foreign matter adhering to the resin member is prevented from being exposed in the flow path, and the foreign matter is prevented from mixing into the liquid flowing in the flow path.

The present disclosure is not limited to the above-described flow path structure and may be realized in various aspects. For example, the present disclosure may be realized in the aspect of a liquid ejecting head, a liquid ejecting apparatus, a method of manufacturing a flow path structure, or the like.

What is claimed is:

1. A flow path structure that includes a first flow path, comprising:
   a first flow path member including a first resin member made of a resin and a first film member having a film;
   a second flow path member laminated on the first flow path member and adhered to the first flow path member, wherein
   the first resin member includes a first front surface that is a surface facing the second flow path member and that is provided with a first recessed portion,
   the first film member includes a first surface and a second surface that is opposite from the first surface,
   at least a portion of the first surface is in close contact with a front surface of the first resin member inside the first recessed portion, and
   the second surface of the first film member and the second flow path member define at least a portion of the first flow path in a region overlapping the first recessed portion in a laminating direction of the first flow path member and the second flow path member.

2. The flow path structure according to claim 1, wherein at least a portion of the first surface is in close contact with the first front surface of the first resin member.

3. The flow path structure according to claim 2, wherein the second flow path member includes a second film member having a film,
   the second film member includes a third surface facing the first flow path member,
   the third surface is adhered to the second surface in a region overlapping the first front surface in the laminating direction, and
   the second surface of the first film member and the third surface of the second film member define the first flow path in the region overlapping the first recessed portion in the laminating direction.

4. The flow path structure according to claim 1, wherein the second flow path member includes a second film member having a film, the second film member includes a third surface facing the first flow path member, and the second surface of the first film member and the third surface of the second film member define the first flow path in the region overlapping the first recessed portion in the laminating direction.

5. The flow path structure according to claim 4, wherein the second flow path member includes a second resin member made of a resin, the second film member includes a fourth surface that is opposite from the third surface, and the second resin member includes a second front surface fixed to at least a portion of the fourth surface.

6. The flow path structure according to claim 5, wherein a second recessed portion facing the first recessed portion is provided on the second front surface, and a front surface of the second resin member inside the second recessed portion and the fourth surface are separated from each other.

7. The flow path structure according to claim 5, wherein a second recessed portion facing the first recessed portion is provided on the second front surface, and at least a portion of the fourth surface is fixed to a front surface of the second resin member inside the second recessed portion.

8. The flow path structure according to claim 1, wherein the first flow path communicates with flow paths extending in a direction intersecting an extending direction of the first flow path, and the flow paths are provided in the first resin member.

9. The flow path structure according to claim 1, wherein the first flow path member is an integrally molded product of the first resin member and the first film member.

10. The flow path structure according to claim 1, wherein the film contains at least one of a polyethylene terephthalate resin, a polyethylene naphthalate resin, a high-density polyethylene resin, and a vinyl chloride resin.

11. The flow path structure according to claim 1, wherein a gas barrier property of the first film member is higher than a gas barrier property of the first resin member.

12. The flow path structure according to claim 11, wherein the film contains a polyglycolic acid resin.

13. The flow path structure according to claim 11, wherein the first film member includes a gas barrier layer containing at least one of polyvinylidene chloride, diamond-like carbon, alumina, and silicon oxide.

14. The flow path structure according to claim 13, wherein the first surface of the first film member is formed by the gas barrier layer.

15. The flow path structure according to claim 1, wherein the first resin member is a resin containing a filler.

16. The flow path structure according to claim 1, wherein the first flow path member includes a cylindrical first pipe made of any one of a polyethylene terephthalate resin, a polyethylene naphthalate resin, a high-density polyethylene resin, a vinyl chloride resin, and metal, the first flow path member is provided with a first through-hole communicating with the first flow path and extending along an intersecting direction intersecting a plane perpendicular to the laminating direction, the first pipe is disposed inside the first through-hole, with an outer peripheral surface of the first pipe being in close contact with an inner peripheral surface of the first through-hole, and an inner peripheral surface of the first pipe defines a second flow path communicating with the first flow path and extending along the intersecting direction.

17. The flow path structure according to claim 16, wherein the first flow path member includes a cylindrical second pipe made of any one of a polyethylene terephthalate resin, a polyethylene naphthalate resin, a high-density polyethylene resin, a vinyl chloride resin, and metal, the first flow path member is provided with a second through-hole communicating with the first flow path and extending along the intersecting direction, the second pipe is disposed inside the second through-hole such that an outer peripheral surface of the second pipe is in close contact with an inner peripheral surface of the second through-hole, and an inner peripheral surface of the second pipe defines a third flow path communicating with the first flow path and extending along the intersecting direction.

18. A liquid ejecting head comprising:
the flow path structure according to claim 1; and
a nozzle communicating with a flow path of the flow path structure and configured to eject a liquid.

19. A liquid ejecting apparatus comprising:
the flow path structure according to claim 1;
a nozzle communicating with the first flow path of the flow path structure and configured to eject a liquid; and
a liquid supply portion configured to supply the liquid to the flow path structure.

20. A method of manufacturing a flow path structure that includes a flow path defined by a first flow path member having a film member having a film and a resin member made of a resin and having a recessed portion, and a second flow path member laminated on the first flow path member, the method comprising:

creating the film member by forming unevenness corresponding to the recessed portion in the film by bending the film while heating the film;

creating the first flow path member in which the film member and the resin member are integrally molded so that the unevenness and the recessed portion correspond to each other, by fixing the film member to a mold and injecting the resin into the mold to perform molding; and adhering the first flow path member and the second flow path member to each other so that the film member and the second flow path member define at least a portion of the flow path in a region overlapping the recessed portion in a laminating direction of the first flow path member and the second flow path member.

* * * * *